(12) United States Patent
Ohgiri et al.

(10) Patent No.: US 8,617,419 B2
(45) Date of Patent: Dec. 31, 2013

(54) LIQUID-CRYSTALLINE MEDIUM AND LIQUID-CRYSTAL DISPLAY

(75) Inventors: Sayuri Ohgiri, Asahi-ku (JP); Masahiko Okamura, Atsugi (JP); Yasushi Sugiyama, Sagamihara (JP); Hideo Ichinose, Odawara (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/439,372

(22) Filed: Apr. 4, 2012

(65) Prior Publication Data
US 2012/0256124 A1 Oct. 11, 2012

(30) Foreign Application Priority Data
Apr. 7, 2011 (EP) .................................. 11002916

(51) Int. Cl.
*C09K 19/32* (2006.01)
*C09K 19/52* (2006.01)
*C09K 19/06* (2006.01)
*C09K 19/34* (2006.01)
*C09K 19/00* (2006.01)
*G02F 1/1333* (2006.01)

(52) U.S. Cl.
USPC .............. 252/299.62; 252/299.01; 252/299.6; 252/299.61; 252/299.66; 428/1.1; 349/86; 349/182

(58) Field of Classification Search
USPC .............. 252/299.01, 299.6, 299.61, 299.62, 252/299.66; 428/1.1; 349/86, 182
See application file for complete search history.

(56) References Cited

U.S. PATENT DOCUMENTS

2011/0261311 A1* 10/2011 Jansen et al. .................. 349/182
2012/0032112 A1* 2/2012 Czanta et al. ............ 252/299.64

* cited by examiner

*Primary Examiner* — Geraldina Visconti
(74) *Attorney, Agent, or Firm* — Millen, White, Zelano & Branigan, P.C.

(57) ABSTRACT

The present invention relates to dielectrically positive, preferably nematic, media comprising one or more polymerisable compounds of formula I

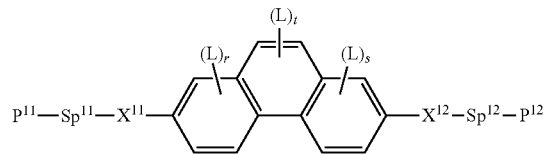

in which the parameters have the meaning given in the text, to polymer-stabilized media obtained therefrom, to the use thereof in liquid-crystal displays, and to these displays, in particular PSA-IPS, PSA-FFS and PSA-positive VA displays.

20 Claims, No Drawings

LIQUID-CRYSTALLINE MEDIUM AND LIQUID-CRYSTAL DISPLAY

FIELD OF THE INVENTION

The present invention relates to liquid-crystalline media, in particular media which are stabilised by a polymer, and to liquid-crystal displays containing these media, especially displays which are addressed by an active matrix and in particular displays of the in-plane switching (IPS), fringe-field switching (FFS) or positive $\Delta\epsilon$ vertically aligned (positive VA) type and very particularly liquid-crystal displays of the PS (polymer stabilised) or PSA (polymer sustained alignment) type.

PRIOR ART AND PROBLEM TO BE SOLVED

The liquid-crystal displays (also called LC displays, "displays" or "LCDs" for short) used at present are usually those of the TN (twisted nematic) type. However, these have the disadvantage of a strong viewing-angle dependence of the contrast.

In addition, so-called VA (vertical alignment) displays are known which have a broader viewing angle. The liquid-crystal cell of a VA display contains a layer of a liquid-crystalline medium between two transparent electrodes, where the liquid-crystalline medium usually has a negative value of the dielectric (DC) anisotropy ($\Delta\epsilon$). In the switched-off state, the molecules of the liquid-crystal layer are aligned perpendicular to the electrode surfaces (homeotropically) or have a tilted homeotropic alignment. On application of an electrical voltage to the electrodes, a realignment of the liquid-crystal molecules parallel to the electrode surfaces takes place.

Furthermore, OCB (optically compensated bend) displays are known which are based on a birefringence effect and have a liquid-crystal layer with a so-called "bend" alignment and usually positive (DC) anisotropy. On application of an electrical voltage, a realignment of the liquid-crystal molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

In particular, IPS (in-plane switching) displays are known which contain a liquid-crystal layer between two substrates, only one of which has an electrode layer, usually with a comb-shaped structure. On application of a voltage, an electric field which has a significant component parallel to the liquid-crystal layer is thereby generated. This causes a realignment of the liquid-crystal molecules in the layer plane.

Furthermore, so-called FFS (fringe-field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

A further development of the above-mentioned display types are the so-called "PS" ("polymer stabilised") displays, which are also known under the term "PSA" ("polymer sustained alignment"). In these, a small amount (for example 0.3%, typically in the range from $\geq 0.1\%$ to $\leq 5\%$, preferably up to $\leq 3\%$) of a polymerisable compound is added to the liquid-crystalline medium and is polymerised or crosslinked in situ between the electrodes, usually by UV photopolymerisation, after introduction into the liquid-crystal cell with an applied electrical voltage. These mixtures may optionally also comprise an initiator, as described, for example, in U.S. Pat. No. 6,781,665. The initiator, for example Irganox® 1076 from Ciba, is preferably added in amounts of 0-1% to the mixture comprising polymerisable compounds. The addition of polymerisable mesogenic or liquid-crystalline compounds, also referred to as "reactive mesogens" (RMs), to the liquid-crystal mixture has proven particularly suitable. In the meantime, the PSA principle is being used in diverse classical liquid-crystal displays. For example, PSA-VA, PSA-OCB, PS-IPS/FFS and PS-TN displays are known. As can be demonstrated in test cells, the PSA method results in stabilisation of the initial alignment of the liquid crystals in the cell. In PSA-OCB displays, it is therefore possible to achieve stabilisation of the bend structure, enabling the offset voltage to be reduced or even omitted entirely. In the case of PSA-VA displays, the "pretilt" measured from the perpendicular to the surface of the display is reduced, which has a positive effect on the response times therein. In the case of PSA displays, polymerisation of the reactive mesogens is intended to take place in the liquid-crystalline mixture. The prerequisite for this is that the liquid-crystal mixture itself does not comprise any polymerisable components. Suitable polymerisable compounds are listed, for example, in Table G.

In addition, so-called positive VA displays have proven to be a particularly favourable embodiment. In these displays, dielectrically positive liquid-crystal media are used. The initial alignment of the liquid crystals in the voltage-free initial state is homeotropic here, i.e. essentially perpendicular to the substrates. Application of an electrical voltage to interdigital electrodes, which generate a field essentially parallel to the layer of the liquid-crystal medium, causes the liquid crystals to be converted into an alignment which is essentially parallel to the substrates. Interdigital electrodes of this type are also usually used in IPS displays. Corresponding polymer stabilisation (PSA) also proves successful in these positive VA displays. A considerable reduction in the response times can also be achieved.

In particular for monitor and especially TV applications, but also for mobile applications (mobile TV) and "notebook" TV (NBTV), optimisation of the response times, but also of the contrast and the luminance (i.e. also transmission) of the liquid-crystal display is still desirable. The PSA method can provide crucial advantages here. In the case of PSA-IPS, PSA-FFS and PSA-positive VA in particular, a shortening of the response times can be achieved without significant adverse effects on other parameters, such as, in particular, the favourable viewing-angle dependence of the contrast of these displays.

Displays comprising liquid crystal mixtures, which have a positive dielectric anisotropy, and polymers are disclosed e.g. in WO 2009/156118 A1.

However, it has been found that the liquid-crystal mixtures and RMs known from the prior art still have various disadvantages on use in PSA displays. The polymerisation should preferably be carried out by means of UV light without the addition of photoinitiators, which may be advantageous for certain applications. In addition, the "material system" selected, comprising liquid-crystal mixture (also referred to below as "liquid-crystal host mixture" or also simply "host mixture" for short) and polymerisable component, should have the lowest possible rotational viscosity and the best possible electrical properties. The so-called "voltage holding ratio" (VHR or HR for short) should be emphasised here. In connection with PSA displays, a high VHR after irradiation with UV light is, in particular, of central importance since UV exposure is usually a necessary part of the manufacturing process of the display, but of course also occurs as "normal" exposure in the finished display.

However, the problem arises that not all combinations of liquid-crystal mixture and polymerisable component by far are suitable for PSA displays since, for example, the VHR is often inadequate for use in TFT displays or since stabilisation of the alignment of the liquid-crystal mixtures is unsatisfactory.

In particular, it is desirable to have available novel materials for PSA displays which have significantly fewer disadvantages for practical application.

Thus, there continues to be a great demand for PSA displays, in particular of the IPS and FFS type, and liquid-crystal media and polymerisable compounds for use in such displays, which do not exhibit the disadvantages described above, or only do so to a small extent, and have improved properties. In particular, there is a great demand for PSA displays, and materials for use in PSA displays, which facilitate high specific resistance at the same time as a large working-temperature range, short response times, even at low temperatures, and a low threshold voltage, a multiplicity of grey shades, high contrast and a wide viewing angle, and also have high values of the voltage holding ratio, in particular also after UV exposure, and in particular have improved response times.

The invention is based on the object of providing novel liquid-crystal mixtures and novel liquid-crystalline media for use in PSA displays which do not have the disadvantages indicated above, or only do so to a reduced extent, and which at the same time facilitate very high specific resistance values, high VHR values, broad viewing-angle ranges, low threshold voltages and particularly short response times.

This object has been achieved in accordance with the invention by liquid-crystalline media and liquid-crystal displays as described in the present application. In particular, it has been found, surprisingly, that the use of liquid-crystalline media according to the invention in PSA displays enables particularly fast response times to be achieved.

For these displays in general and in particular in the case of PSA-IPS and PSA-FFS displays, novel liquid-crystalline media having improved properties are necessary. In particular, the addressing times must be improved for many types of application. Liquid-crystalline media having relatively low viscosities ($\eta$), especially having relatively low rotational viscosities ($\gamma_1$), are therefore necessary. In particular for monitor applications, the rotational viscosity should be 100 mPa·s or less, preferably 80 mPa·s or less, preferably 60 mPa·s or less and especially 55 mPa·s or less. Besides this parameter, the media must have a nematic phase range of suitable width and position, and suitable birefringence ($\Delta n$), and the dielectric anisotropy ($\Delta\epsilon$) should be sufficiently high to facilitate a fairly low operating voltage. $\Delta\epsilon$ should preferably be greater than 2 and very preferably greater than 3, but preferably not greater than 20, particularly preferably not greater than 15 and very particularly preferably not greater than 12, since this would stand in the way of an at least fairly high specific resistance.

For applications as displays for notebooks or other mobile applications, the rotational viscosity should preferably be 90 mPa·s or less, more preferably 55 mPa·s or less and particularly preferably 50 mPa·s or less.

The dielectric anisotropy here should preferably be 3.0 or more, preferably 4.0 or more and particularly preferably 6.0 or more.

For applications as displays for televisions, the dielectric anisotropy should preferably be greater than 2 and particularly preferably greater than 3, but preferably less than 10, preferably less than 8 and particularly preferably less than 5. The clearing point here should be in the range from 50° C. or more to 100° C. or less, and the birefringence should be in the range from 0.08 or more to 0.13 or less.

There is therefore a considerable demand for liquid-crystalline media having suitable properties for practical applications, such as a broad nematic phase range, suitable optical anisotropy ($\Delta n$) corresponding to the display type used, a suitably high $\Delta\epsilon$ and especially low viscosities for particularly short response times.

PRESENT INVENTION

Surprisingly, it has now been found that it is possible to achieve liquid-crystalline media having a suitably high $\Delta\epsilon$, a suitable phase range and $\Delta n$ which do not have the disadvantages of the materials from the prior art, or at least only do so to a considerably reduced extent.

These improved liquid-crystalline media in accordance with the present application comprise at least the following compounds:
one or more polymerisable compounds of formula I

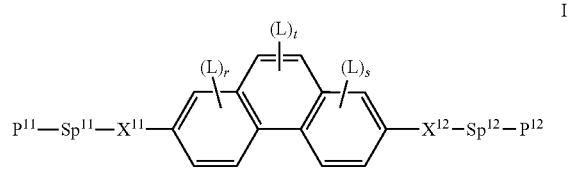

in which
P$^{11}$ and P$^{12}$ are independently from one another a polymerisable group, preferably acrylate or methacrylate,
Sp$^{11}$ and Sp$^{12}$ are independently from one another a spacer group having from one to 10 C-atoms or a single bond,
X$^{11}$ and X$^{12}$ are independently from one another —O—, —O—CO—, —CO—O—, —O—CO—O— or a single bond,
L are in each occurrence independently from each other H, F, Cl or alkyl with 1 to 5 C-atoms, preferably H, F or Cl,
r and s are independently of one another 0, 1, 2 or 3,
t is 0, 1 or 2,
and
one or more dielectrically positive compounds selected from the group of compounds of formulae II and III, preferably of compounds having a dielectric anisotropy of greater than 3 each:

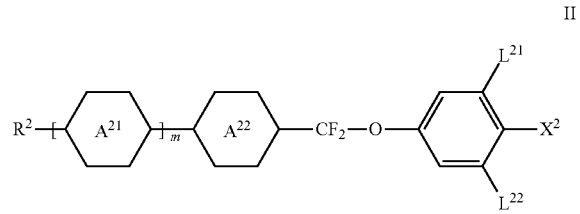

-continued

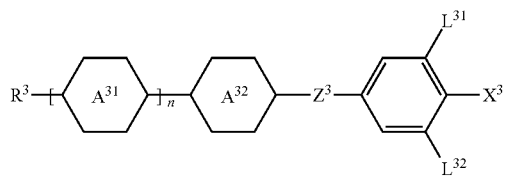

in which
R² denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

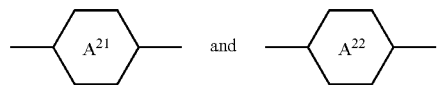

on each appearance, independently of one another, denote

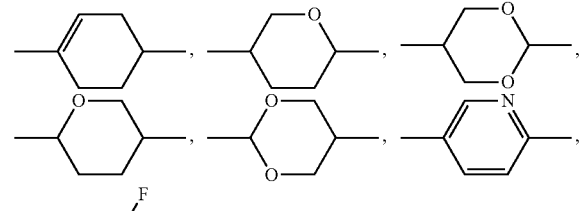

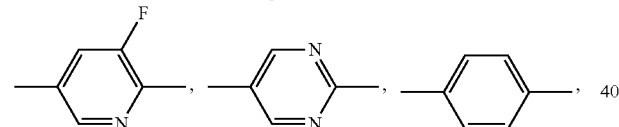

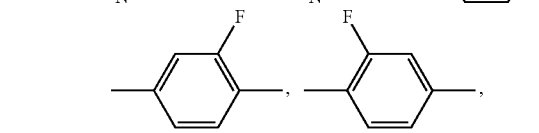

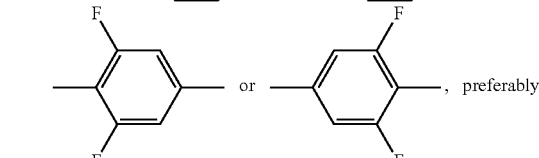

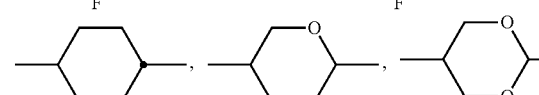

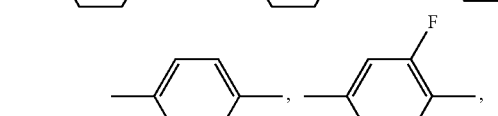

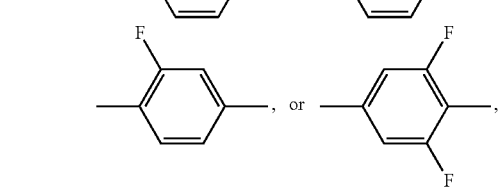

L²¹ and L²² denote H or F, preferably L²¹ denotes F,
X² denotes halogen, halogenated alkyl or alkoxy having 1 to 3 C atoms or halogenated alkenyl or alkenyloxy having 2 or 3 C atoms, preferably F, Cl, —OCF₃, —O—CH₂CF₃, —O—CH=CH₂, —O—CH=CF₂ or —CF₃, very preferably F, Cl, —O—CH=CF₂ or —OCF₃,
m denotes 0, 1, 2 or 3, preferably 1 or 2 and particularly preferably 1,
R³ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

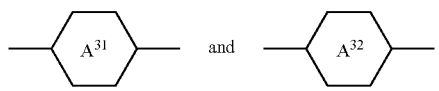

on each appearance, independently of one another, are

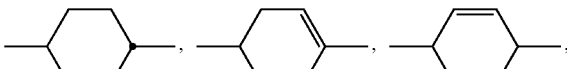

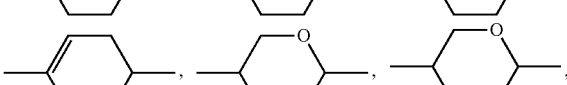

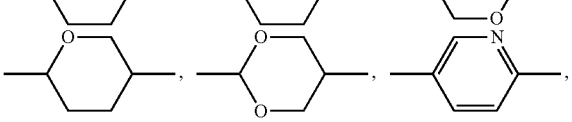

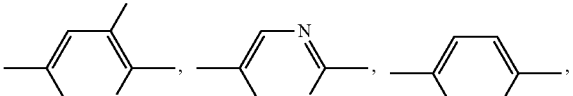

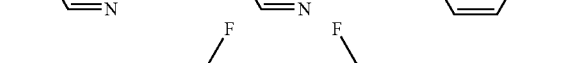

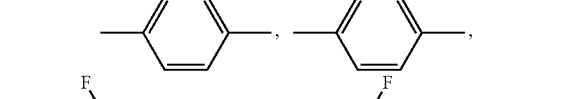

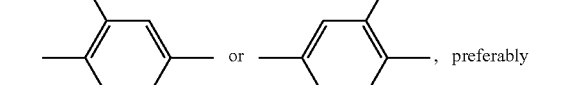

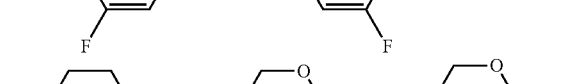

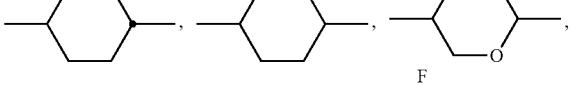

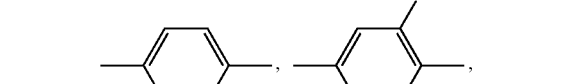

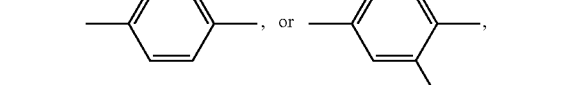

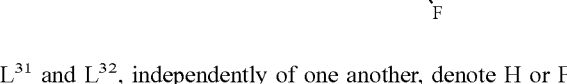

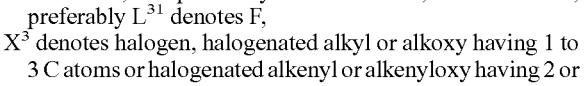

L³¹ and L³², independently of one another, denote H or F, preferably L³¹ denotes F,
X³ denotes halogen, halogenated alkyl or alkoxy having 1 to 3 C atoms or halogenated alkenyl or alkenyloxy having 2 or 3 C atoms, F, Cl, —OCF$_3$, —O—CH$_2$CF$_3$, —O—CH=CF$_2$, —O—CH=CH$_2$ or —CF$_3$, very preferably F, Cl, —O—CH=CF$_2$ or —OCF$_3$, Z$^3$ denotes —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond and very preferably —COO—, trans-CH=CH— or a single bond, and n denotes 0, 1, 2 or 3, preferably 1 or 3 and particularly preferably 1, and optionally one or more dielectrically neutral compounds of the formula IV

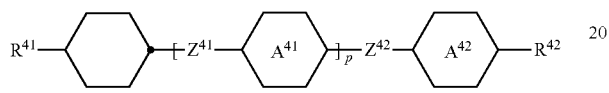

IV in which

R$^{41}$ and R$^{42}$, independently of one another, have the meaning indicated above for R$^2$ under formula II, preferably R$^{41}$ denotes alkyl and R$^{42}$ denotes alkyl or alkoxy or R$^{41}$ denotes alkenyl and R$^{42}$ denotes alkyl,

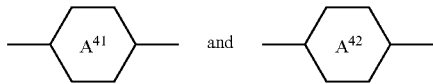

independently of one another and, if

occurs twice, also these independently of one another, denote

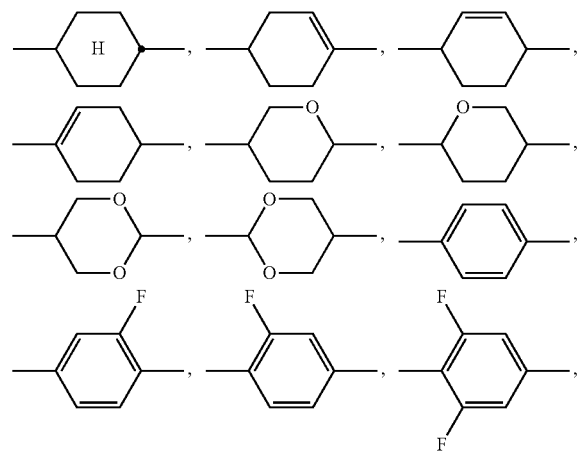

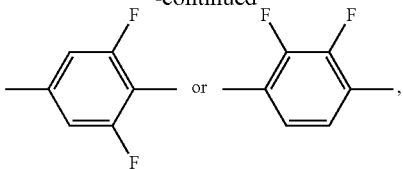

preferably one or more of

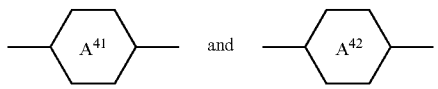

denotes or denote

Z$^{41}$ and Z$^{42}$, independently of one another and, if Z$^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more thereof denotes/denote a single bond, and p denotes 0, 1 or 2, preferably 0 or 1.

The liquid-crystalline media in accordance with the present application preferably comprise one or more at least monoreactive, polymerisable compounds. In a particularly preferred embodiment, the liquid-crystalline media comprise one or more di-reactive, polymerisable compounds.

The liquid-crystalline media in accordance with the present application may optionally comprise one or more polymerisation initiators, preferably one or more photoinitiators. The concentration of the initiator or the total concentration of the initiators in the media is preferably 0.001% to 1%, preferably 0.1% to 10%, based on the total concentration of the polymerisable compounds.

These liquid-crystalline media in accordance with the present application preferably have a nematic phase.

The invention furthermore relates to a liquid-crystalline medium comprising a liquid-crystal mixture according to the invention as described above and below and one or more polymerisable compounds, preferably selected from reactive mesogens.

The invention furthermore relates to a liquid-crystalline medium comprising
a polymerisable component (component A) comprising one or more polymerisable compounds, preferably selected from reactive mesogens, and
a (non-polymerisable) liquid-crystalline component (component B), also referred to below as "liquid-crystal host mixture" or "host mixture", consisting of a liquid-crystal mixture according to the invention comprising ≥5% of one or more compounds of the formulae II and/or III as described above and below.

The invention furthermore relates to the use of liquid-crystal mixtures and liquid-crystalline media according to the invention in PS and PSA displays, in particular the use in PS and PSA displays containing a liquid-crystalline medium, for improving the response times by in-situ polymerisation of the polymerisable compound(s) in the PA or PSA display, preferably without application of an electric and/or magnetic field. However, the polymerisation of the polymerisable compound(s) can also be carried out with application of an electric and/or magnetic field, preferably an electric field. The voltage applied in this case should rather be low and in particular in the range between 0 V and the threshold voltage ($V_{th}$) of the electro-optical effect used.

The invention furthermore relates to a liquid-crystal display containing a liquid-crystalline medium according to the invention, in particular a PS or PSA display, particularly preferably a PS-IPS, PSA-IPS, PS-FFS or PSA-FFS display or a PS-positive VA or PSA-positive VA display.

The invention furthermore relates to a liquid-crystal display of the PS or PSA type comprising a liquid-crystal cell consisting of two substrates, where at least one substrate is transparent to light and at least one substrate has an electrode layer, and a layer, located between the substrates, of a liquid-crystalline medium comprising a polymerised component and a low-molecular-weight component, where the polymerised component is obtainable by polymerisation of one or more polymerisable compounds in the liquid-crystalline medium between the substrates of the liquid-crystal cell, preferably with application of an electrical voltage and where the low-molecular-weight component is a liquid-crystal mixture according to the invention as described above and below.

The invention furthermore relates to a liquid-crystal display which contains a liquid-crystalline medium which has been stabilised by polymerisation of the polymerisable compound(s).

The displays in accordance with the present invention are preferably addressed by an active matrix (active matrix LCDs, AMDs for short), preferably by a matrix of thin-film transistors (TFTs). However, the liquid crystals according to the invention can also be used in an advantageous manner in displays having other known addressing means.

The invention furthermore relates to a process for the preparation of a liquid-crystalline medium according to the invention by mixing one or more low-molecular-weight liquid-crystalline compounds, or a liquid-crystal mixture according to the invention, with one or more polymerisable compounds, and optionally with further liquid-crystalline compounds and/or additives.

The invention furthermore relates to a process for the production of a liquid-crystal display according to the invention by mixing a liquid-crystal mixture according to the invention with one or more polymerisable compounds, and optionally with further liquid-crystalline compounds and/or additives, introducing the resultant mixture into a liquid-crystal cell as described above and below, and polymerising the polymerisable compound(s), optionally with application of an electrical voltage, preferably in the range between 0 V and $V_{th}$, and particularly preferably without application of an electrical voltage.

The invention furthermore relates to a process for the production of a liquid-crystal display in which a medium according to the invention is stabilised in the display by polymerisation of the polymerisable compound(s), optionally with application of a voltage.

The following meanings apply above and below:

The term "PSA" is, unless indicated otherwise, used to represent PS displays and PSA displays.

The terms "tilt" and "tilt angle" relate to a tilted alignment of the molecules of a liquid-crystalline medium relative to the surfaces of the cell in a liquid-crystal display (here preferably a PS or PSA display). The tilt angle here denotes the average angle (<90°) between the longitudinal molecular axes of the liquid-crystal molecules (the liquid-crystal director) and the surface of the plane-parallel outer plates which form the surface of the liquid-crystal cell.

The term "mesogenic group" is known to the person skilled in the art and is described in the literature, and denotes a group which, due to the anisotropy of its attracting and repelling interactions, essentially contributes to causing a liquid-crystalline (LC) phase in low-molecular-weight or polymeric substances. Compounds containing mesogenic groups (mesogenic compounds) do not necessarily have to have a liquid-crystalline phase themselves. It is also possible for mesogenic compounds to exhibit liquid-crystalline phase behaviour only after mixing with other compounds and/or after polymerisation. Typical mesogenic groups are, for example, rigid rod- or disc-shaped units. An overview of the terms and definitions used in connection with mesogenic or liquid-crystalline compounds is given in Pure Appl. Chem. 73(5), 888 (2001) and C. Tschierske, G. Pelzl, S. Diele, Angew. Chem. 2004, 116, 6340-6368.

The term "spacer group" or "spacer" for short, also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing a mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

"Unpolymerisable" means that the compounds are stable or unreactive to a polymerisation reaction, at least under the conditions used for polymerisation of the polymerisable compounds.

For the purposes of this invention, the term "liquid-crystalline medium" is intended to denote a medium which comprises a liquid-crystal mixture and one or more polymerisable compounds (such as, for example, reactive mesogens). The term "liquid-crystal mixture" (or "host mixture") is intended to denote a liquid-crystalline mixture which consists exclusively of unpolymerisable, low-molecular-weight compounds, preferably of two or more liquid-crystalline compounds and optionally further additives, such as, for example, chiral dopants or stabilisers.

Particular preference is given to liquid-crystal mixtures and liquid-crystal-line media which have a nematic phase, in particular at room temperature.

The liquid-crystal mixtures and liquid-crystalline media according to the invention may also comprise further additives known to the person skilled in the art and described in the literature, such as, for example, polymerisation initiators, inhibitors, stabilisers, surface-active substances or chiral dopants. These may be polymerisable or unpolymerisable. Polymerisable additives are accordingly classed in the polymerisable component. Unpolymerisable additives are accordingly classed in the liquid-crystal mixture (host mixture) or the unpolymerisable component.

For the production of PSA displays, the polymerisable compounds are polymerised or crosslinked (if a compound contains two or more polymerisable groups) by in-situ polymerisation in the liquid-crystalline medium between the substrates of the liquid-crystal display, optionally with application of a voltage, preferably in the range from 0 V to $V_{th}$, but particularly preferably without application of a voltage. The polymerisation can be carried out in one step. It is also possible firstly to carry out the polymerisation in a first step with application of a voltage in order to produce stabilisation of the alignment, and subsequently, in a second polymerisation step, to polymerise or crosslink the compounds which have not reacted in the first step without an applied voltage (end curing).

Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. For example, the commercially available photo-initiators Irgacure 651®, Irgacure 184®, Irgacure 907®, Irgacure 369® or Darocure 1173® (all Ciba AG) are suitable for free-radical polymerisation. If an initiator is employed, its proportion is preferably 0.001 to 5%, particularly preferably 0.001 to 1%, based on the mixture as a whole. However, the polymerisation can also be carried out without addition of an initiator. In a further preferred embodiment, the liquid-crystalline medium does not comprise a polymerisation initiator.

The polymerisable component (component A) or the liquid-crystalline medium (component B) may also comprise one or more stabilisers in order to prevent undesired spontaneous polymerisation of the RMs, for example during storage or transport. Suitable types and amounts of stabilisers are known to the person skilled in the art and are described in the literature. For example, the commercially available stabilisers from the Irganox® series (Ciba AG), such as, for example, Irganox® 1076 (likewise Ciba AG), are particularly suitable. If stabilisers are employed, their proportion, based on the total amount of the RMs or the polymerisable component A), is preferably 10-10,000 ppm, particularly preferably 50 to 500 ppm.

The polymerisable compounds are also suitable for polymerisation without initiator, which is accompanied by considerable advantages, such as, for example, lower materials costs and in particular less contamination of the liquid-crystalline medium by possible residual amounts of the initiator or degradation products thereof.

The liquid-crystalline media according to the invention for use in PSA displays preferably comprise ≤5%, particularly preferably ≤3%, and preferably ≥0.01%, particularly preferably ≥0.1%, of polymerisable compounds, in particular polymerisable compounds of the formulae given above and below.

Particular preference is given to liquid-crystalline media comprising one, two or three polymerisable compounds.

Preference is furthermore given to achiral polymerisable compounds and to liquid-crystalline media in which the compounds of component A) and/or B) are selected exclusively from the group consisting of achiral compounds.

Preference is furthermore given to liquid-crystalline media in which the polymerisable component (or component A) comprises one or more polymerisable compounds containing one polymerisable group (monoreactive) and one or more polymerisable compounds containing two or more, preferably two, polymerisable groups (di- or multireactive).

Preference is furthermore given to PSA displays and liquid-crystalline media in which the polymerisable component or component A) comprises exclusively polymerisable compounds containing two polymerisable groups (direactive).

The polymerisable compounds can be added individually to the liquid-crystal mixtures, but it is also possible to use mixtures comprising two or more polymerisable compounds to be employed in accordance with the invention. In the case of polymerisation of such mixtures, copolymers are formed. The invention furthermore relates to the polymerisable mixtures mentioned above and below. The polymerisable compounds can be mesogenic or non-mesogenic. Particular preference is given to polymerisable mesogenic compounds, also known as reactive mesogens (RMs).

Suitable and preferred RMs for use in liquid-crystalline media and PSA displays according to the invention are described below.

The liquid-crystalline media in accordance with the present application preferably comprise in total 0.05 to 10%, preferably 0.1 to 4.0%, particularly preferably 0.2 to 2.0%, of polymerisable compounds, preferably of the formula I.

Particularly preferred compounds of the formula I are selected from its following sub-formulae, formulae I-1 to I-10:

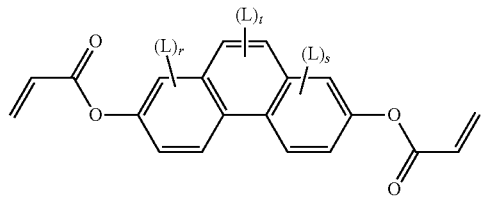

I-1

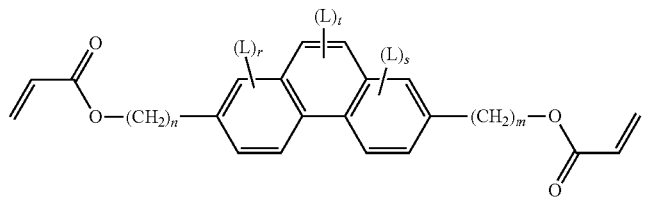

I-2

-continued
I-3
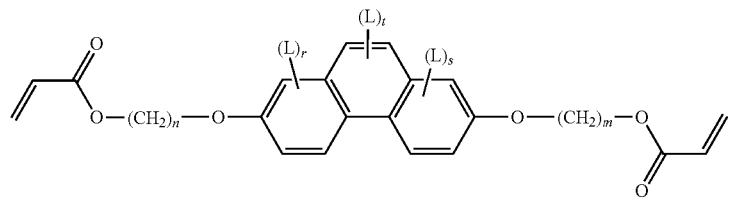
I-4
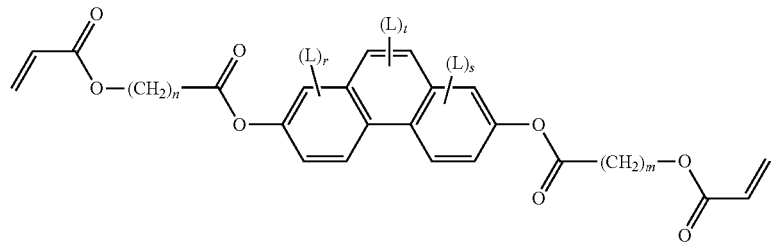
I-5
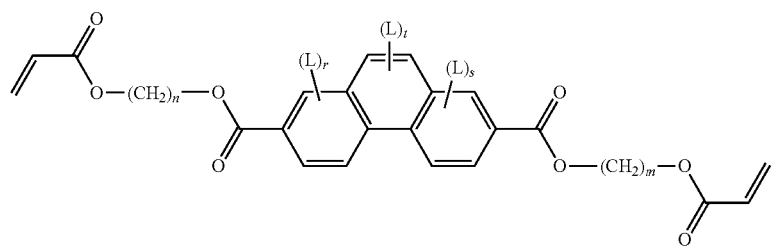
I-6
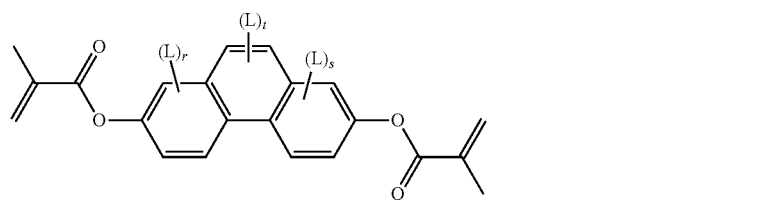
I-7
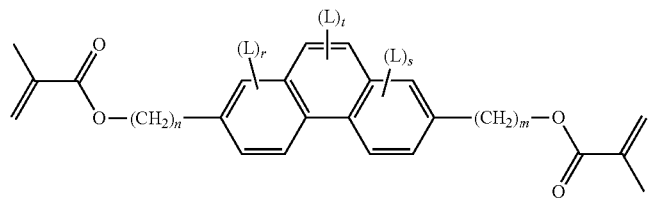
I-8
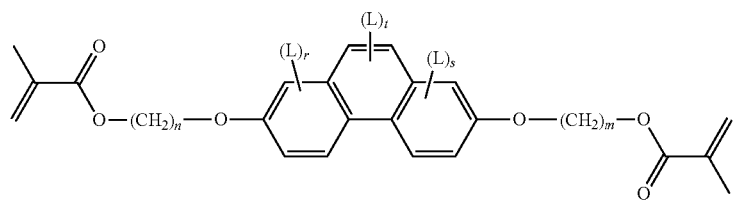
I-9
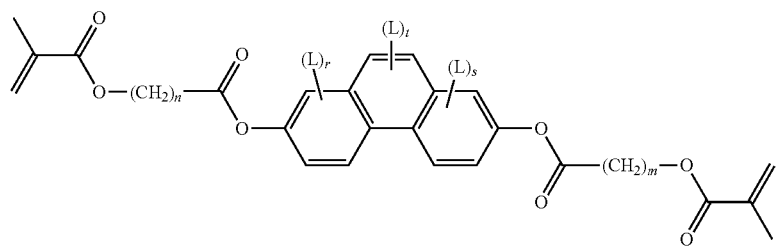

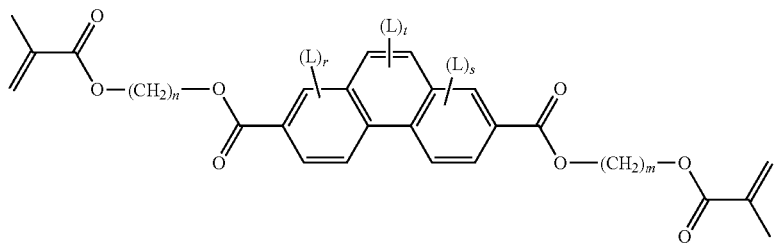

I-10 in which
l r, s and t have the meanings given above and
n and m are independently of one another an integer from 1 to 18, preferably from 2 to 5.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I, preferably F or Cl and particularly preferably F.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Rx preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc. Particularly preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc. Particularly preferred alkenyl groups are, for example, ethenyl, propenyl, butenyl, pentenyl, hexenyl, heptenyl, octenyl.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc. Particularly preferred alkoxy groups are, for example, methoxy, ethoxy, 2-methoxyethoxy, n-propoxy, i-propoxy, n-butoxy, i-butoxy, s-butoxy and t-butoxy.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

The polymerisable compounds and RMs can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Further synthetic methods are given in the documents cited above and below. In the simplest case, the synthesis of such RMs is carried out, for example, by esterification or etherification of 2,6-dihydroxy-naphthalene or 4,4'-dihydroxybiphenyl using corresponding acids, acid derivatives or halogenated compounds containing a group P, such as, for example, (meth)acryloyl chloride or (meth) acrylic acid, in the presence of a dehydrating reagent, such as, for example, DCC (dicyclohexylcarbodiimide).

The preparation of the liquid-crystalline media which can be used in accordance with the invention is carried out in a manner conventional per se, for example by mixing one or more of the above-mentioned compounds with one or more polymerisable compounds as defined above, and optionally with further liquid-crystalline compounds and/or additives. In general, the desired amount of the components used in smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the liquid-crystalline media according to the invention.

It goes without saying to the person skilled in the art that the liquid-crystal-line media according to the invention may also comprise compounds in which, for example, H, N, O, Cl or F have been replaced by their corresponding isotopes.

The structure of the liquid-crystal displays according to the invention corresponds to the usual geometry for PSA displays, as described in the prior art cited at the outset. Geometries without protrusions are preferred, in particular those in which, in addition, the electrode on the coloured-filter side is unstructured and only the electrode on the TFT side has slits. Particularly suitable and preferred electrode structures for PS-VA displays are described, for example, in US 2006/0066793 A1.

The liquid-crystal mixtures and liquid-crystalline media according to the invention are in principle suitable for any type of PS or PSA display, in particular those based on liquid-crystalline media of positive dielectric anisotropy, particularly preferably for PSA-IPS or PSA-FFS displays. However, the person skilled in the art will also be able, without inventive step, to employ suitable liquid-crystal mixtures and liquid-crystalline media according to the invention in other displays of the PS or PSA type which differ from the above-mentioned displays, for example, through their basic structure or through the nature, arrangement or structure of the individual components used, such as, for example, the substrates, alignment layers, electrodes, addressing elements, backlighting, polarisers, coloured filters, compensation films optionally present, etc.

The individual compounds of the formulae II to V are employed in a concentration of 1% to 20%, preferably of 1% to 15%. These limits apply, in particular, if in each case two or more homologous compounds, i.e. compounds of the same formula, are employed. If only one individual substance, i.e. only one homologue, of the compounds of a formula is employed, its concentration can be in the range from 2% to 20% and in the case of some compounds up to 30% or more.

In a preferred embodiment of the present invention, the liquid-crystal medium comprises one or more dielectrically positive compounds having a dielectric anisotropy of greater than 3, selected from the group of the compounds of the formulae II-1 and II-2:

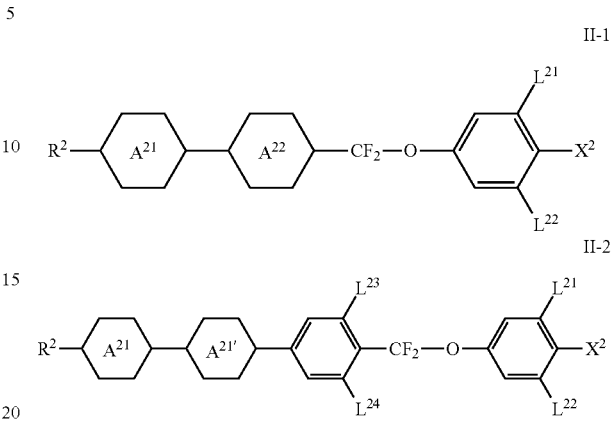

n which the parameters have the respective meanings indicated above under formula II, and $L^{23}$ and $L^{24}$, independently of one another, denote H or F, preferably $L^{23}$ denotes F, and

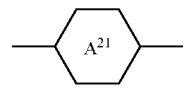

has one of the meanings given for

and, in the case of formulae II-1 and II-2, $X^2$ preferably denotes F or $OCF_3$, particularly preferably F, and, and/or selected from the group of the compounds of the formulae III-1 and III-2:

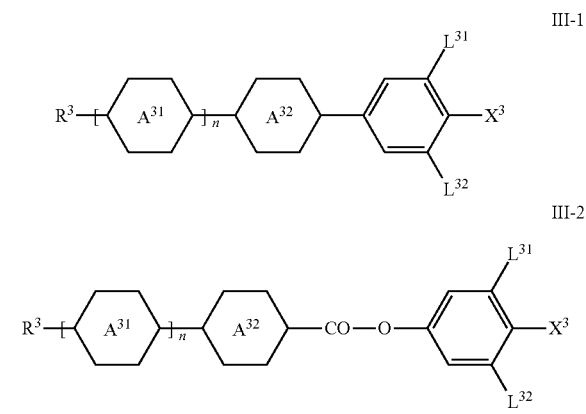

in which the parameters have the meanings given under formula III, and the media in accordance with the present invention may comprise, alternatively or in addition to the compounds of the formulae III-1 and/or III-2, one or more compounds of the formula III-3

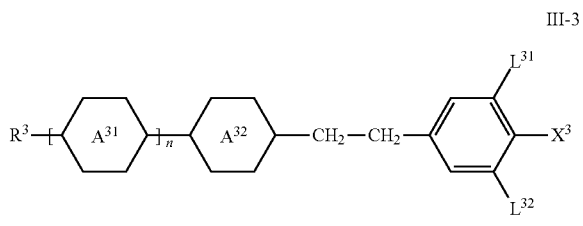

III-3

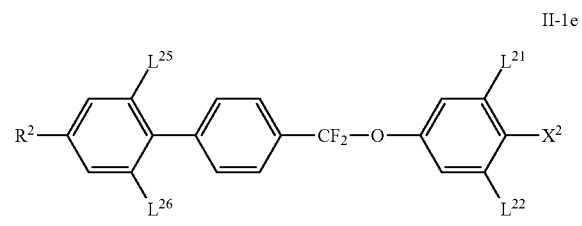

II-1e in which the parameters have the respective meanings indicated above.

The liquid-crystal medium preferably comprises compounds selected from the group of the compounds of the formulae II-1 to II-2 in which $L^{21}$ and $L^{22}$ and/or $L^{23}$ and $L^{24}$ both denote F.

In a preferred embodiment, the liquid-crystal medium comprises compounds selected from the group of the compounds of the formula II-2 in which $L^{21}$, $L^{22}$, $L^{23}$ and $L^{24}$ all denote F.

The liquid-crystal medium preferably comprises one or more compounds of the formula II-1. The compounds of the formula II-1 are preferably selected from the group of the compounds of the formulae II-1a to II-1e, preferably of formula II-1d:

in which the parameters have the respective meanings indicated above, and $L^{25}$ and $L^{26}$, independently of one another and of the other parameters, denote H or F, and preferably in the formulae II-1a and II-1b, $L^{21}$ and $L^{22}$ both denote F, in the formulae II-1c and II-1d, $L^{21}$ and $L^{22}$ both denote F and/or $L^{23}$ and $L^{24}$ both denote F, and in formula II-1e, $L^{21}$, $L^{22}$ and $L^{23}$ denote F.

The liquid-crystal medium preferably comprises one or more compounds of the formula II-2, which are preferably selected from the group of the compounds of the formulae II-2a to II-2j, preferably of formula II-2j:

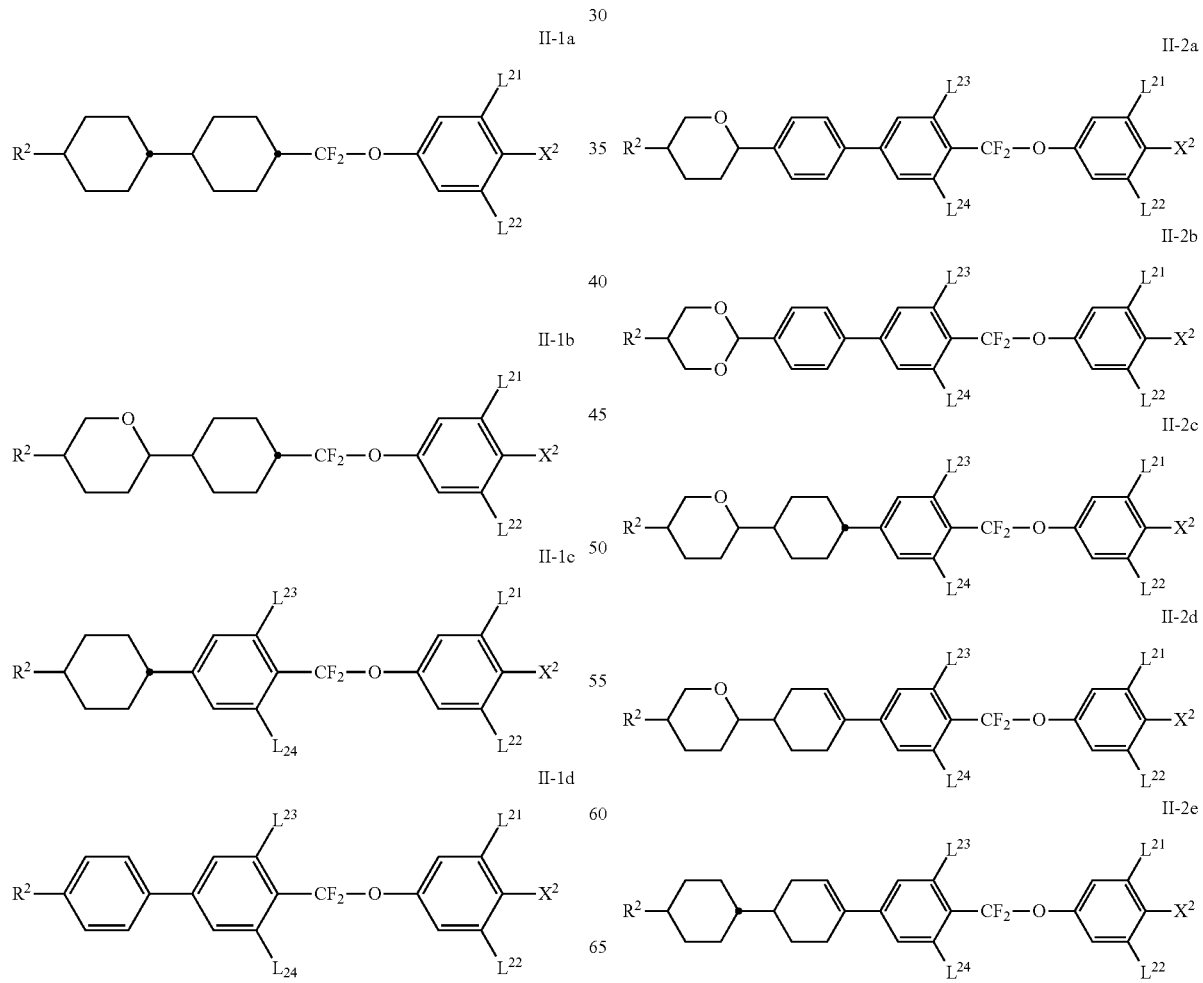

II-2f
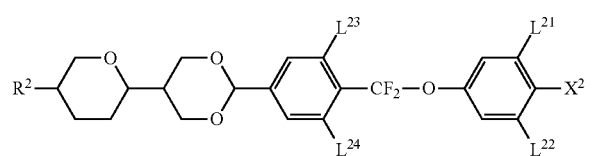

II-2g
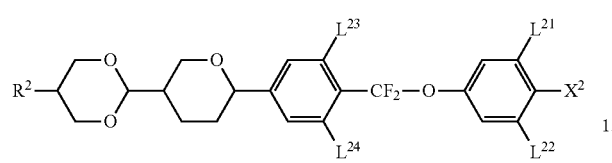

II-2h
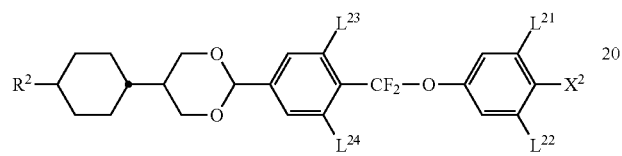

II-2i
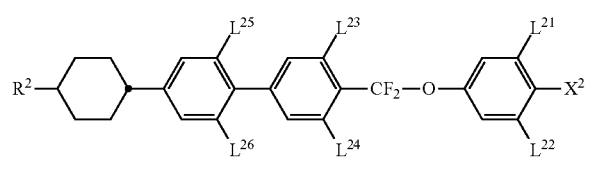

II-2j
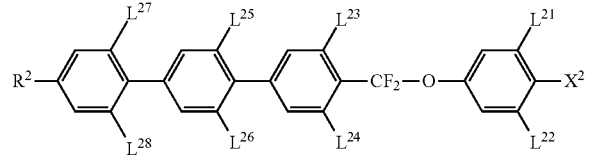

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

The liquid-crystal medium preferably comprises compounds selected from the group of the compounds of the formulae II-1a to II-1e in which $L^{21}$ and $L^{22}$ both denote F and/or $L^{23}$ and $L^{24}$ both denote F.

In a preferred embodiment, the liquid-crystal medium comprises compounds selected from the group of the compounds of the formulae II-1a to II-1i in which $L^{21}$, $L^{22}$, $L^{23}$ and $L^{24}$ all denote F.

Especially preferred compounds of the formula II-2 are the compounds of the following formulae:

II-2a-1
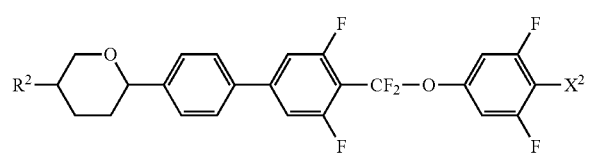

II-2c-1

II-2d-1

II-2e-1

II-2f-1

II-2h-1

II-2i-1

II-2i-2

II-2j-1

II-2j-2
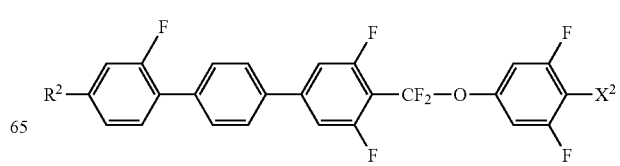

in which $R^2$ and $X^2$ have the meanings indicated above, and $X^2$ preferably denotes F.

The liquid-crystal medium preferably comprises one or more compounds of the formula III-1. The compounds of the formula III-1 are preferably selected from the group of the compounds of the formulae III-1a to III-1j, preferably from formulae III-1c, III-1f, III-1g and III-1j:

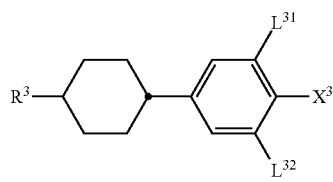
III-1a

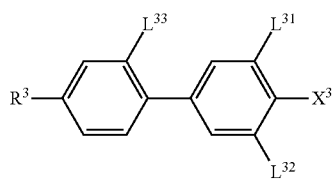
III-1b

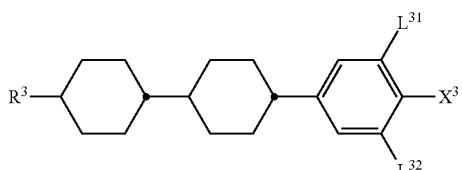
III-1c

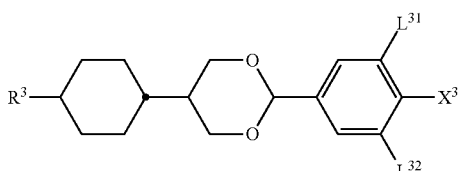
III-1d

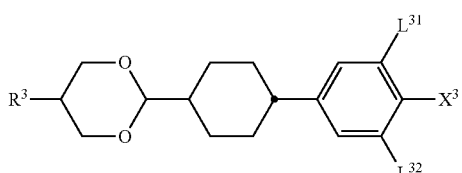
III-1e

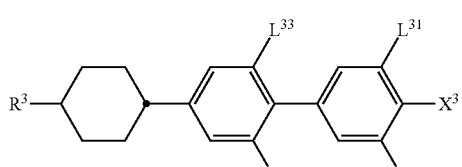
III-1f

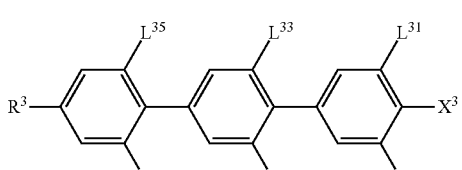
III-1g

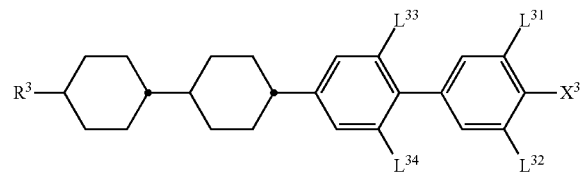
III-1h

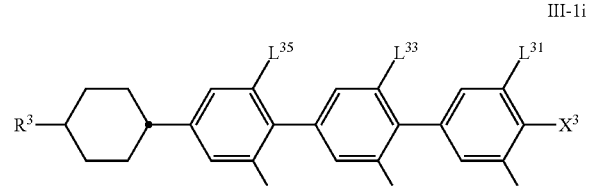
III-1i

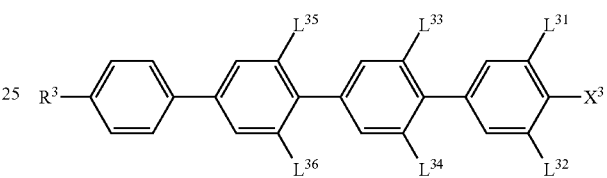
III-1j in which the parameters have the meanings given above and preferably in which the parameters have the respective meanings indicated above, and the parameters $L^{33}$, $L^{34}$, $L^{35}$ and $L^{36}$, independently of one another and of the other parameters, denote H or F.

The liquid-crystal medium preferably comprises one or more compounds of the formula III-1c, which are preferably selected from the group of the compounds of the formulae III-1c-1 to III-1c-5, preferably of formulae III-1c-3 and III-1c-4:

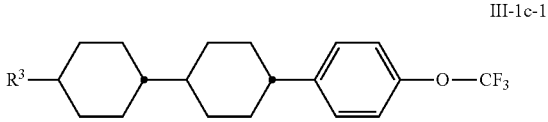
III-1c-1

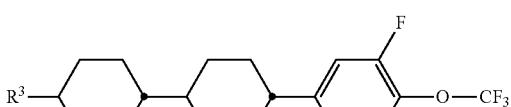
III-1c-2

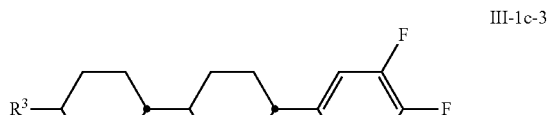
III-1c-3

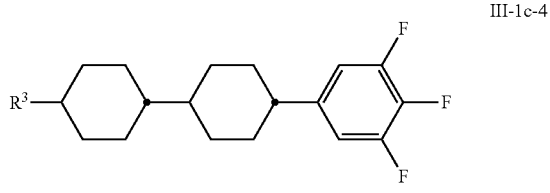
III-1c-4

III-1c-5 in which R³ has the meaning indicated above.

The liquid-crystal medium preferably comprises one or more compounds of the formula III-1f, which are preferably selected from the group of the compounds of the formulae III-1f-1 to III-1f-5, preferably of formulae III-1f-1, III-1f-2, III-1f-4 and III-1f-5, more preferably of formulae III-1f-1, III-1f-4 and III-1f-5, more preferably:

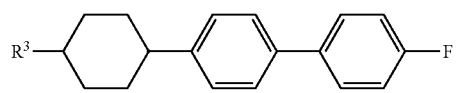
III-1f-1

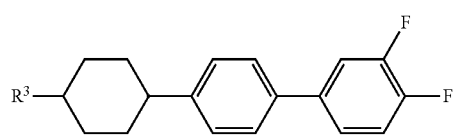
III-1f-2

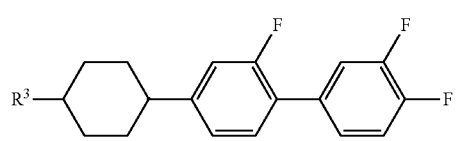
III-1f-3

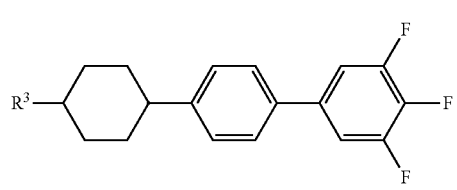
III-1f-4

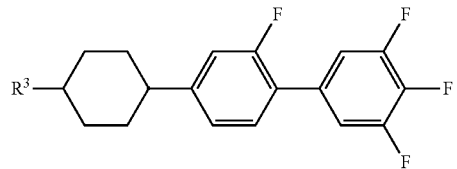
III-1f-5 in which R³ has the meaning indicated above.

The liquid-crystal medium preferably comprises one or more compounds of the formula III-1g, which are preferably selected from the group of the compounds of the formulae III-1g-1 to III-1g-5, preferably of formula III-1g-3:

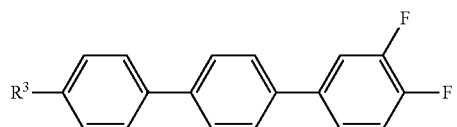
III-1g-1

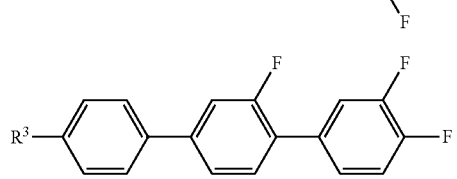
III-1g-2

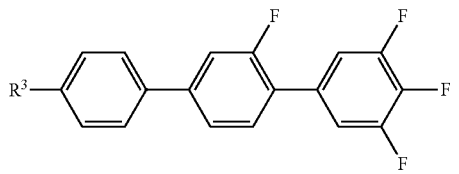
III-1g-3

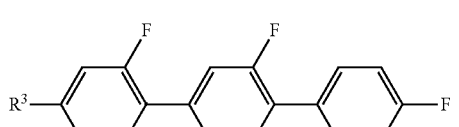
III-1g-4

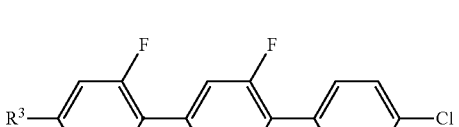
III-1g-5 in which R³ has the meaning indicated above.

The liquid-crystal medium preferably comprises one or more compounds of the formula III-1h, which are preferably selected from the group of the compounds of the formulae III-1h-1 to III-1h-3, preferably of the formula III-1h-3:

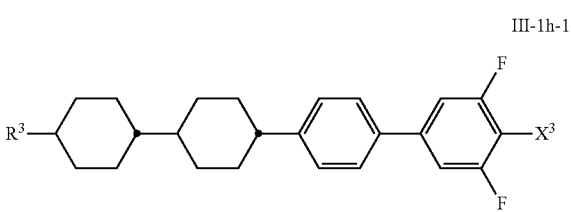
III-1h-1

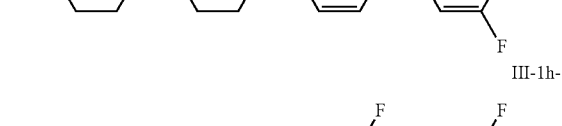
III-1h-2

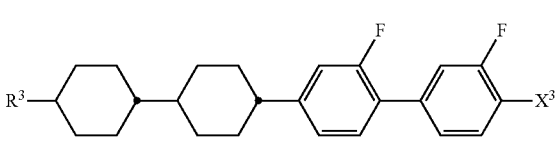
III-1h-3 in which the parameters have the meanings given above, and X³ preferably denotes F.

The liquid-crystal medium preferably comprises one or more compounds of the formula III-1i, which are preferably selected from the group of the compounds of the formulae III-1i-1 and III-1i-2, preferably of the formula III-1i-2:

III-1i-1

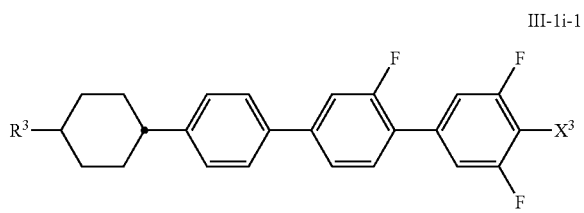

III-1i-2

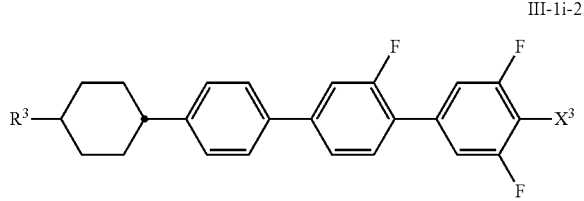

in which the parameters have the meanings given above, and $X^3$ preferably denotes F.

The liquid-crystal medium preferably comprises one or more compounds of the formula III-1j, which are preferably selected from the group of the compounds of the formulae III-1j-1 and III-1j-2, preferably of the formula III-1j-1:

III-1j-1

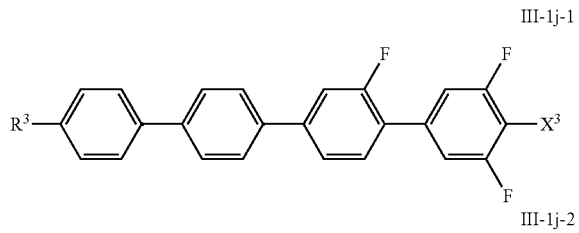

III-1j-2

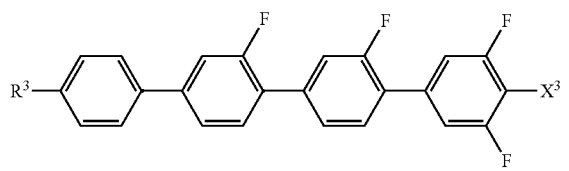

in which the parameters have the meanings given above.

The liquid-crystal medium preferably comprises one or more compounds of the formula III-2. The compounds of the formula III-2 are preferably selected from the group of the compounds of the formulae III-2a and III-2b:

III-2a

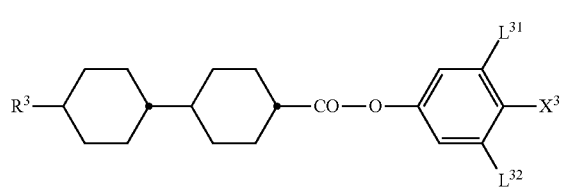

III-2b

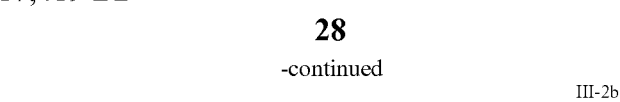

in which the parameters have the respective meanings indicated above, and the parameters $L^{33}$ and $L^{34}$, independently of one another and of the other parameters, denote H or F.

The liquid-crystal medium preferably comprises one or more compounds of the formula III-2a, which are preferably selected from the group of the compounds of the formulae III-2a-1 to III-2a-6:

III-2a-1

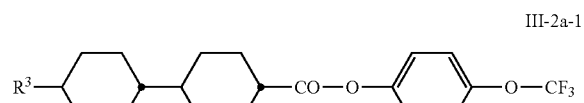

III-2a-2

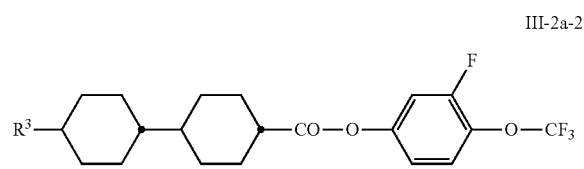

III-2a-3

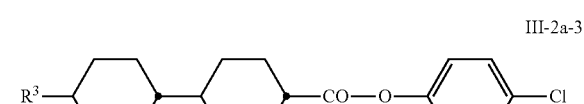

III-2a-4

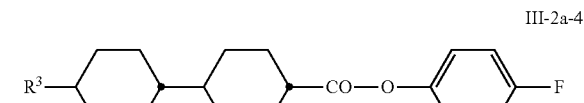

III-2a-5

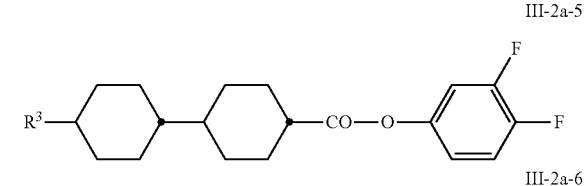

III-2a-6

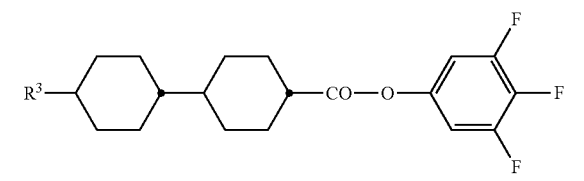

in which $R^3$ has the meaning indicated above.

The liquid-crystal medium preferably comprises one or more compounds of the formula III-2b, which are preferably selected from the group of the compounds of the formulae III-2b-1 to III-2b-4, preferably III-2b-4:

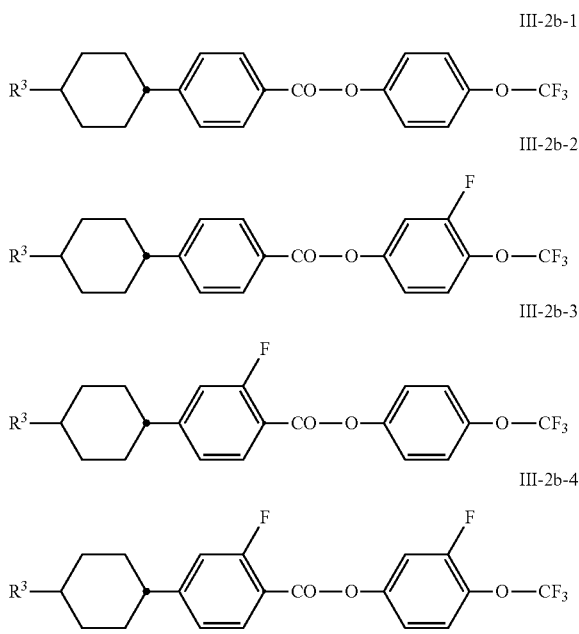

III-2b-1

III-2b-2

III-2b-3

III-2b-4 in which R³ has the meaning indicated above.

Alternatively or in addition to the compounds of the formulae III-1 and/or III-2, the media in accordance with the present invention may comprise one or more compounds of the formula III-3

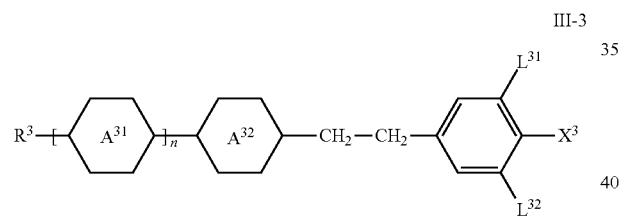

III-3 in which the parameters have the respective meanings indicated above under formula III.

These compounds are preferably selected from the group of the formulae III-3a and III-3b:

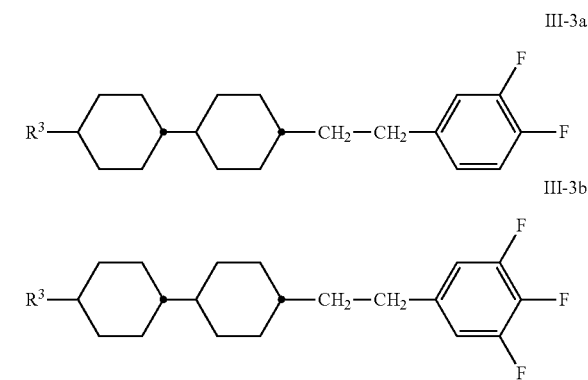

III-3a

III-3b in which R³ has the meaning indicated above.

The liquid-crystalline media in accordance with the present invention preferably comprise one or more dielectrically neutral compounds having a dielectric anisotropy in the range from −1.5 to 3, preferably selected from the group of the compounds of the formulae IV and V.

The liquid-crystalline media in accordance with the present invention preferably comprise one or more compounds selected from the group of the compounds of the formulae IV-1 to IV-6:

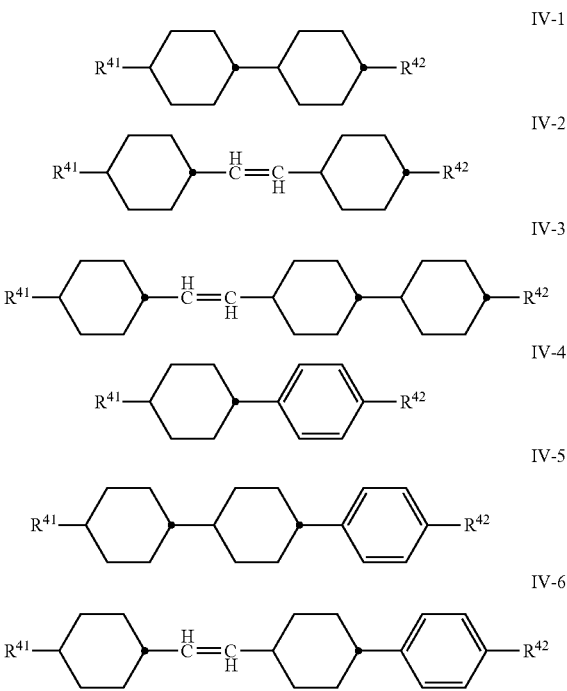

IV-1

IV-2

IV-3

IV-4

IV-5

IV-6 in which $R^{41}$ and $R^{42}$ have the respective meanings indicated above under formula IV, and, in the formulae IV-1, IV-5 and IV-6, $R^{41}$ preferably denotes alkyl or alkenyl, preferably alkenyl, and $R^{42}$ preferably denotes alkyl or alkenyl, preferably alkyl, in formula IV-2, $R^{41}$ and $R^{42}$ preferably denote alkyl, and in formula IV-4, $R^{41}$ preferably denotes alkyl or alkenyl, more preferably alkyl, and $R^{42}$ preferably denotes alkyl or alkoxy, more preferably alkoxy.

The liquid-crystalline media in accordance with the present invention preferably comprise one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably in each case one or more compounds of the formulae IV-1, IV-4 and IV-5 and very preferably in each case one or more compounds of the formulae IV-1, IV-4, IV-5 and IV-6.

In a preferred embodiment, the liquid-crystalline media in accordance with the present invention preferably comprise one or more compounds of the formula IV-1, more preferably selected from the respective sub-formulae thereof of the formulae CC-n-m and/or CC-n-Om and/or CC-n-V and/or CC-nV-m and/or CC-Vn-m, more preferably of the formulae CC-n-m and/or CC-n-V and/or CC-nV-m and very preferably selected from the group of the formulae CC-3-1, CC-3-2, CC-3-3, CC-3-4, CC-3-5, CC-3-O1, CC-3-V, CC-4-V, CC-5-V and CC-3-V1. The definitions of these abbreviations (acronyms) are indicated below in Table D or are evident from Tables A to C.

In a preferred embodiment, the liquid-crystalline media in accordance with the present invention preferably comprise one or more compounds of the formula IV-4, more preferably selected from the respective sub-formulae thereof of the formulae CP-V-n and/or CP-nV-m and/or CP-Vn-m, more preferably of the formulae CP-nV-m and/or CP-V2-n and very preferably selected from the group of the formulae CP-2V-1, CP-1V-2 and CP-V2-1. The definitions of these abbreviations (acronyms) are indicated below in Table D or are evident from Tables A to C.

In a preferred embodiment, the liquid-crystalline media in accordance with the present invention preferably comprise one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, the liquid-crystal medium preferably comprises one or more compounds of the formula IV-1, more preferably selected from the respective sub-formulae thereof of the formulae CC-n-m, CC-n-Om, CC-n-V, CC-n-Vm, CC-V-V, CC-V-Vn and/or CC-nV-Vm, more preferably of the formulae CC-n-m and/or CC-n-V and/or CC-n-Vm and very preferably selected from the group of the formulae CC-3-1, CC-3-2, CC-3-3, CC-3-4, CC-3-5, CC-3-O1, CC-3-V, CC-4-V, CC-5-V and CC-3-V1 and in particular selected from the group of the formulae CC-3-V, CC-4-V, CC-5-V CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the preceding one or another, the liquid-crystal mixtures in accordance with the present invention comprise the compounds of the formula IV selected from the group of the compounds of the formulae IV-1 to IV-6 as shown above and optionally of the formulae IV-7 to IV-14, preferably of formulae IV-7 and/or IV-14:

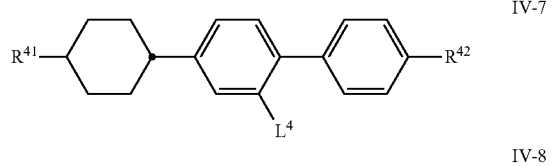

IV-7

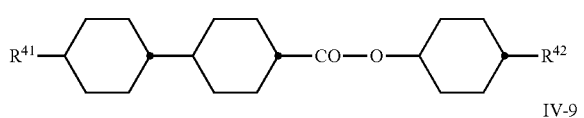

IV-8

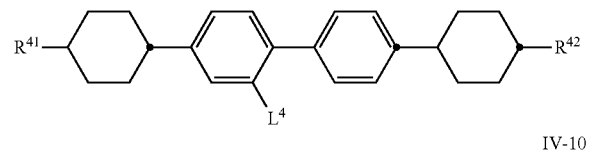

IV-9

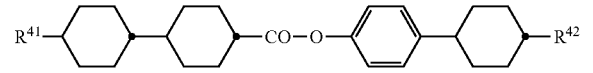

IV-10

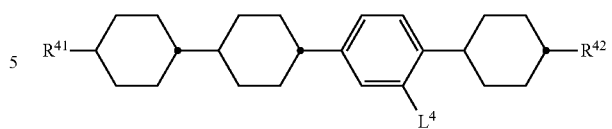

IV-11

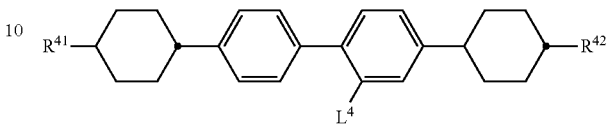

IV-12

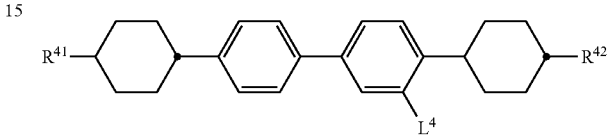

IV-13

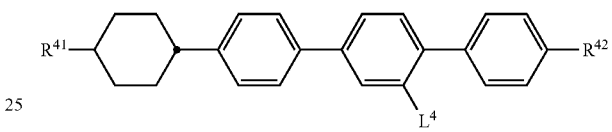

IV-14

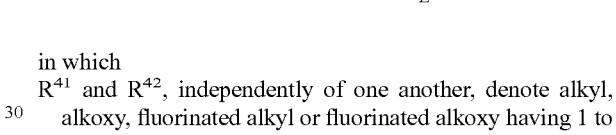

in which
$R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and
$L^4$ denotes H or F.

In a preferred embodiment, the liquid-crystal medium preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

In a preferred embodiment, the liquid-crystal medium preferably comprises one or more compounds of the formula IV-14, more preferably selected from the respective sub-formulae thereof of the formulae CPGP-3-2, CPGP-5-2 and CPGP-3-4, more preferably of the formulae CPGP-3-2 and/or CPGP-3-2 and very particularly preferably of the formula CPGP-5-2. The definitions of these abbreviations (acronyms) are indicated below in Table D or are evident from Tables A to C.

The liquid-crystalline media in accordance with the present invention preferably additionally comprise one or more dielectrically neutral compounds having a dielectric anisotropy in the range from −1.5 to 3, of the formula V

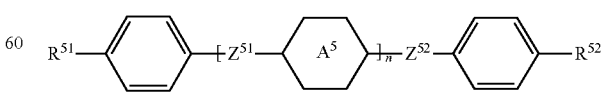

V in which
$R^{51}$ and $R^{52}$, independently of one another, have the meanings indicated above for $R^2$ under formula II, preferably $R^{51}$ denotes alkyl and $R^{52}$ denotes alkyl or alkenyl,

on each appearance, independently of one another, denotes

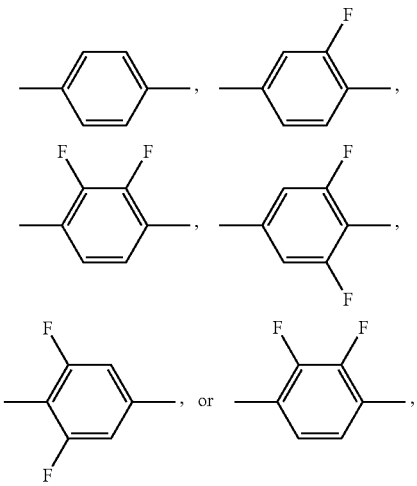

preferably one or more

denote

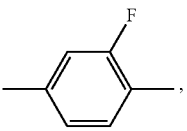

$Z^{51}$ and $Z^{52}$, independently of one another and, if $Z^{51}$ occurs twice, also these independently of one another, denote —$CH_2CH_2$—, —COO—, trans-CH=CH—, trans-CF=CF—, —$CH_2O$—, —$CF_2O$— or a single bond, preferably one or more thereof denotes/denote a single bond, and r denotes 0, 1 or 2, preferably 0 or 1, particularly preferably 1.

The liquid-crystalline media in accordance with the present invention preferably comprise one or more compounds selected from the group of the compounds of the formulae V-1 and V-2, preferably of formula V-1:

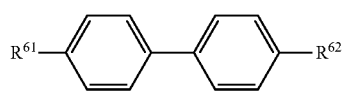

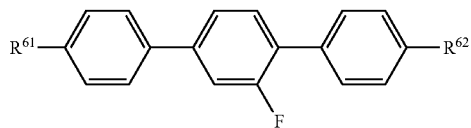

in which $R^{51}$ and $R^{52}$ have the respective meanings indicated above under formula V, and $R^{51}$ preferably denotes alkyl and in formula V-1, $R^{52}$ preferably denotes alkenyl, preferably —$(CH_2)_2$—CH=CH—$CH_3$, and in formula V-2, $R^{52}$ preferably denotes alkyl, —$(CH_2)_2$—CH=$CH_2$ or —$(CH_2)_2$—CH=CH—$CH_3$.

The liquid-crystalline media in accordance with the present invention preferably comprise one or more compounds selected from the group of the compounds of the formulae V-1 and V-2, in which $R^{51}$ preferably denotes n-alkyl and, in formula V-1, $R^{52}$ preferably denotes alkenyl and, in formula V-2, $R^{52}$ preferably denotes n-alkyl.

In a preferred embodiment, the liquid-crystal medium preferably comprises one or more compounds of the formula V-1, more preferably of the sub-formula PP-n-2Vm thereof, still more preferably of the formula PP-1-2V1. The definitions of these abbreviations (acronyms) are indicated below in Table D or are evident from Tables A to C.

In a preferred embodiment, the liquid-crystal medium preferably comprises one or more compounds of the formula V-2, more preferably of the sub-formulae PGP-n-m, PGP-n-2V and PGP-n-2Vm thereof, still more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

The liquid-crystalline media in accordance with the present invention preferably comprise compounds selected from the group of the compounds of the formulae I to V and more preferably of the formulae I to IV, more preferably predominantly consist, still more preferably essentially consist and very preferably completely consist thereof.

Besides the compounds of the formula I, the liquid-crystal mixtures in accordance with the present invention preferably comprise compounds of the formulae II and/or III, preferably of the formula II and of compounds of the formula III. The liquid-crystal mixtures in accordance with the present invention particularly preferably additionally comprise one or more compounds of the formulae IV and/or V, particularly preferably of the formula IV.

The mixtures in accordance with the present invention may of course also comprise in each case one or more compounds of a plurality of the five formulae, formulae I to V, and even all five formulae, formulae I to V.

In this application, comprise in connection with compositions means that the entity in question, i.e. generally the medium, comprises the compound or compounds indicated, preferably in a total concentration of 10% or more and very preferably 20% or more.

In this connection, predominantly consist of means that the entity in question comprises 55% or more, preferably 60% or more and very preferably 70% or more of the compound or compounds indicated.

In this connection, essentially consist of means that the entity in question comprises 80% or more, preferably 90% or more and very preferably 95% or more of the compound or compounds indicated.

In this connection, completely consist of means that the entity in question comprises 98% or more, preferably 99% or more and very preferably 100.0% of the compound or compounds indicated.

Other mesogenic compounds which are not mentioned explicitly above can optionally and advantageously also be used in the media in accordance with the present invention. Such compounds are known to the person skilled in the art.

The liquid-crystal media in accordance with the present invention preferably have a clearing point of 65° C. or more, more preferably 70° C. or more, still more preferably 80° C. or more, particularly preferably 85° C. or more and very particularly preferably 90° C. or more.

The nematic phase of the media according to the invention preferably extends at least from 0° C. or less to 65° C. or more, more preferably at least from −20° C. or less to 70° C. or more, very preferably at least from −30° C. or less to 70° C. or more and in particular at least from −40° C. or less to 90° C. or more. In individual preferred embodiments, it may be necessary for the nematic phase of the media according to the invention to extend to a temperature of 100° C. or more and even to 110° C. or more.

The $\Delta\in$ of the liquid-crystal medium according to the invention, at 1 kHz and 20° C., is preferably 2 or more, more preferably 4 or more. In particular, $\Delta\in$ is 10 or less, but in the case of positive VA displays may also be up to 30 or less.

The $\Delta$n of the liquid-crystal media in accordance with the present invention, at 589 nm ($Na^D$) and 20° C., is preferably in the range from 0.080 or more to 0.120 or less, more preferably in the range from 0.085 or more to 0.115 or less, even more preferably in the range from 0.090 or more to 0.110 or less and very particularly preferably in the range from 0.095 or more to 0.105 or less.

For IPS displays for television applications, drivers having driver voltages of about 15.6 V or of about 18 V are preferably used.

The compounds of the formulae II and III are preferably used in a concentration of 2% to 60%, more preferably 3% to 35% and very particularly preferably 4% to 30% of the mixture as a whole.

The compounds of the formulae IV and V are preferably used in a concentration of 2% to 70%, more preferably 5% to 65%, even more preferably 10% to 60% and very particularly preferably from 10%, preferably from 15%, to 55% of the mixture as a whole.

The media according to the invention may optionally comprise further liquid-crystal compounds in order to adjust the physical properties. Such compounds are known to the person skilled in the art. Their concentration in the media in accordance with the present invention is preferably 0% to 30%, more preferably 0.1% to 20% and very preferably 1% to 15%.

Optionally the liquid-crystalline media according to the present invention comprise besides the compound or compounds of formula I further one reactive compound or more reactive compounds, each of which may be a mesogenic compound or a non-mesogenic, isotropic compound.

Also optionally the liquid-crystalline media according to the present invention additionally comprise a polymerisation initiator, which preferably is a photoinitiator.

Especially in the second preferred embodiment of the present invention mentioned below, the liquid-crystal medium preferably comprises one or more compounds of the formula IV, more preferably of the formula IV-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated below in Table D.

The concentration of the compound of the formula CC-3-V in the media according to the invention is preferably 20% to 60% and particularly preferably 25% to 55%.

The liquid-crystal media preferably comprise in total 50% to 100%, more preferably 70% to 100% and very preferably 80% to 100% and in particular 90% to 100% preferably predominantly consist of and very preferably entirely consist of one or more of the compounds of the formulae I, II, III, IV and V, preferably of the formulae I, II, III and IV or V.

Regarding the use of the compounds of the formulae IV and/or V, preferably of the formula IV, the present invention has two different embodiments.

In the first of these preferred embodiments, the liquid-crystal mixtures comprise one or more compounds of the formulae IV and/or V which carry one or more non-terminal alkenyl groups (such as, for example, CC-3-V1, PP-1-2V1 and CCP-2V-1), but only few to no compounds of these formulae which carry one or more terminal alkenyl groups (such as, for example, CC-3-V, CCP-V-1 and PGP-2-2V). Instead, the liquid-crystal mixtures in accordance with this embodiment preferably comprise compounds of the formulae IV and/or V which carry one or two non-terminal alkenyl groups and/or compounds of these formulae containing an alkyl end group and an alkyl or alkoxy end group. The component which the compounds of the formulae IV and V form preferably consists predominantly, more preferably consists essentially and very preferably consists completely of compounds containing one or two non-terminal alkenyl groups and/or compounds containing an alkyl end group and an alkyl or alkoxy end group, preferably of compounds containing one or two non-terminal alkenyl groups. The proportion of the corresponding compounds containing one or more non-terminal alkenyl groups in the liquid-crystal mixtures and preferably in this component is then preferably 5% or more, preferably 10% or more, and preferably 70% or less, preferably 60% or less.

In the second one of these preferred embodiments, the liquid-crystal mixtures comprise, in addition or alternatively to the compounds of the formulae IV and/or V already mentioned in the first preferred embodiments, one or more compounds of these formulae which carry one or two terminal alkenyl groups. In this embodiment, the liquid-crystal mixtures preferably comprise compounds of the formulae IV and/or V which carry one or two terminal alkenyl groups. The component which the compounds of the formulae IV and V form preferably consists predominantly, more preferably consists essentially and very preferably consists completely of compounds containing one or two terminal alkenyl groups. The proportion of the corresponding compounds containing one or more terminal alkenyl groups in the liquid-crystal mixtures and preferably in this component is then preferably 10% to 70%, preferably up to 60%.

In the following conditions for the liquid-crystalline media according to preferred embodiments of the present invention are given. These preferred conditions may be fulfilled individually or, preferably in combinations with each other. Binary combinations thereof are preferred, whereas ternary or higher combinations thereof are particularly preferred.

The medium comprises either less than 1% of compounds of formula II or, preferably, even no compounds of formula II at all.

Alternatively to the condition given directly above, the medium comprises one or more compounds of formula II, preferably selected from the group of compounds of formulae II-1 and II-2, preferably selected from the group of compounds of formulae II-1d and II-2j, and these latter ones in particular of formula II-2j-2, and, in this case, preferably the total concentration of these compounds in the medium is in the range from 1% or more to 15% or less, preferably from 1.5% or more to 10% or less and most preferably from 2% or more to 5% or less.

The medium comprises one or more compounds selected from the group of compounds of formulae III-1, preferably of formulae III-1f, preferably selected from the group of compounds of formulae III-1f-1, III-1f-4 and III-1f-5, most preferably of formulae III-1f-1 and/or III-1f-4, and in this case preferably the total concentration of these compounds in the medium is in the range from 2% or more to 20% or less, preferably from 3% or more to 15% or less and most preferably from 4% or more to 12% or less.

The medium comprises one or more compounds of formula III-1f-1 and in this case preferably the total concentration of these compounds in the medium is in the range from 1% or more to 15% or less, preferably from 2% or more to 10% or less and most preferably from 3% or more to 8% or less.

The medium comprises one or more compounds of formula III-1f-4 and in this case preferably the total concentration of these compounds in the medium is in the range from 3% or more to 20% or less, preferably from 4% or more to 15% or less and most preferably from 6% or more to 12% or less.

The medium comprises one or more compounds of formula III-1f-5 and in this case preferably the total concentration of these compounds in the medium is in the range from 3% or more to 20% or less, preferably from 4% or more to 15% or less and most preferably from 6% or more to 12% or less.

The medium comprises one or more compounds of formula IV, preferably selected from the group of compounds of formulae IV-1 and IV-5, preferably of the formulae CC-n-V1 and/or CC-n-V and/or CCP-V-1 and/or CCP-V2-1, more preferably of formulae CC-3-V and/or CC-3-V1 and/or CCP-V-1 and/or CCP-V2-1, preferably the total concentration of these compounds in the medium is in the range from 45% or more to 65% or less, preferably from 50% or more to 60% or less and most preferably from 53% or more to 58% or less.

The medium comprises the compound of the formula CC-3-V and, preferably, the total concentration of this compound in the medium is in the range from 20% or more to 55% or less, preferably either from 20% or more to 30% or less or from 45% or more to 55% or less.

The medium comprises the compound of the formula CC-3-V1 and, preferably, the total concentration of this compound in the medium is in the range from 2% or more to 10% or less, preferably from 4% or more to 8% or less.

The medium comprises the compound of the formula CCP-V-1 and/or CCP-2V-1 and, preferably, the total concentration of each one of these compounds, which is present in the medium is in the range from 5% or more to 20% or less, preferably from 10% or more to 15% or less.

The medium comprises one or more compounds of formula V, preferably of formula V-1, preferably of the formula PP-1-2V1, preferably the total concentration of these compounds in the medium is in the range from 5% or more to 10% or less.

The clearing point of the liquid-crystalline medium is 80° C. or more, more preferably 90° C. or more, and preferably the medium comprises one or more compounds having four six-membered rings, preferably these compounds are selected from the group of compounds of formulae III-1h, III-1i, III-1j and IV-14, preferably of formulae III-1h-3 and/or III-1j-1 and/or CPGP-3-2 and/or CPGP-5-2 and/or CPGP-3-4, preferably the total concentration of these compounds in the medium is in the range from 1% or more to 12% or less, preferably from 2% or more to 8% or less.

The medium comprises one or more compounds of formula IV-14, preferably of formulae CPGP-3-2 and/or CPGP-5-2 and/or CPGP-3-4, preferably of formula CPGP-5-2 and, preferably, the total concentration of each one these compounds, which is present in the medium, is in the range from 1% or more to 7% or less, preferably from 2% or more to 5% or less.

The medium comprises one or more compounds of formula IV-7, preferably selected from the group of formulae CPP-3-2, CPP-5-2 and CGP-3-2, more preferably of the formulae CPP-3-2 and/or CGP-3-2 and very particularly preferably of the formula CPP-3-2 and, preferably, the total concentration of each one these compounds, which is present in the medium, is in the range from 2% or more to 15% or less, preferably from 5% or more to 9% or less.

In the present application, the expression dielectrically positive describes compounds or components where $\Delta\epsilon > 3.0$, dielectrically neutral describes those where $-1.5 \leq \Delta\epsilon \leq 3.0$ and dielectrically negative describes those where $\Delta\epsilon < -1.5$. $\Delta\epsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The layer thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_\parallel - \epsilon_\perp)$, while $\epsilon_{av.}$ is $(\epsilon_\parallel + 2\epsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage ($V_{th}$) in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm$^2$ and a guard ring. The alignment layers are SE-1211 from Nissan Chemicals, Japan, for homeotropic alignment ($\varepsilon_\parallel$) and polyimide AL-1054 from Japan Synthetic Rubber, Japan, for homogeneous alignment ($\varepsilon_\perp$). The capacitances are determined using a Solatron 1260 frequency response analyser using a sine wave with a voltage of 0.3 V$_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal mixtures and liquid-crystalline media in accordance with the present invention may, for example, comprise one or more chiral dopants, preferably selected from the group consisting of the compounds from Table F below, in the usual concentrations. The total concentration of these chiral dopants is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

Furthermore, 0 to 15%, preferably 0 to 10%, of one or more additives selected from the group comprising pleochroic dyes, nanoparticles, conductive salts, complex salts and substances for modifying the dielectric anisotropy, the viscosity and/or the alignment of the nematic phases can be added to the liquid-crystalline media. Suitable and preferred conductive salts are, for example, ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258, 1973). Substances of this type are described, for example, in DE-A-22 09 127, DE-A-22 40 864, DE-A-23 21 632, DE-A-23 38 281, DE-A-24 50 088, DE-A-26 37 430 and DE-A-28 53 728.

The liquid-crystal mixtures according to the invention consist of a plurality of compounds, preferably 3 to 30, more preferably 4 to 20 and, in the case of liquid-crystal mixtures which comprise alkenyl compounds, very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media in accordance with the present invention can be modified in such a way that they can be used in all known types of liquid-crystal displays, either using the liquid-crystal media as such, such as TN, TN-AMD, ECB-AMD, VAN-AMD, IPS-AMD, FFS-AMD and positive VA LCDs, or in composite systems, such as PDLC, NCAP, PN LCDs and especially in PSA-IPS, PSA-FFS and positive VA LCDs.

The polymerisable compounds are preferably polymerised in the display by irradiation with UV radiation for a predetermined time. In a preferred embodiment, the electrical voltage is applied to the display here. The applied voltage is preferably an alternating voltage (typically with 1 kHz), preferably in the range from 0.1 V to 10 V, particularly preferably in the range from 0.5 V to 5 V. In a particularly preferred embodiment, the applied voltage is lower than the threshold voltage ($V_{10}$) of the liquid-crystal mixture and very particularly preferably no voltage is applied during the polymerisation. In the examples, a 50 mW/cm$^2$ mercury vapour lamp is used, unless explicitly indicated otherwise. The intensity is measured using a standard UV meter (Ushio UNI-Meter) with a 365 nm band-pass filter.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while table B shows the linking groups. Table C gives the meanings of the codes for the left-hand or right-hand end groups. Table D shows illustrative structures of compounds together with their respective abbreviations.

TABLE A

Ring elements

C

D        D1

A        A1

TABLE A-continued

Ring elements

| | | | |
|---|---|---|---|
| P | 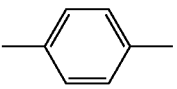 | | |
| G | 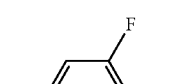 | GI | 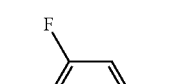 |
| U | 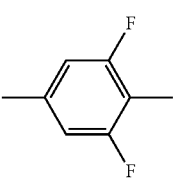 | UI | 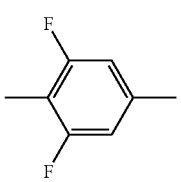 |
| Y | 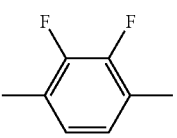 | | |
| M | 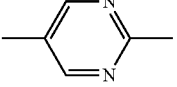 | MI | 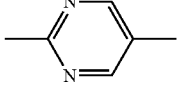 |
| N | 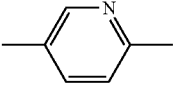 | NI | 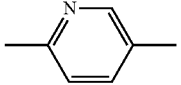 |
| Np | 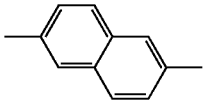 | | |
| N3f | 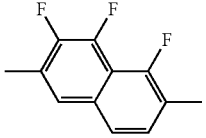 | N3fI | 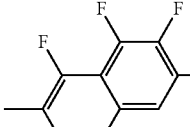 |
| tH | 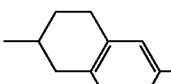 | tHI | 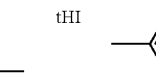 |
| tH2f | 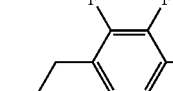 | tH2fI | 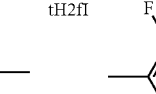 |
| dH | 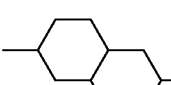 | | |
| K | 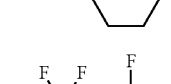 | KI | 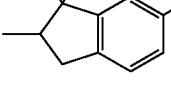 |
| L |  | LI | 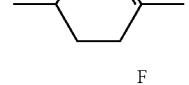 |
| F | 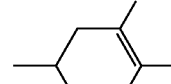 | FI | 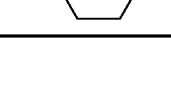 |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |

TABLE C-continued

| End groups | | | |
|---|---|---|---|
| Left-hand side | | Right-hand side | |
| -DO- | CF$_2$HO— | -OD | —OCF$_2$H |
| -TO- | CF$_3$O— | -OT | —OCF$_3$ |
| -OXF-/-FXO- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are spacers for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

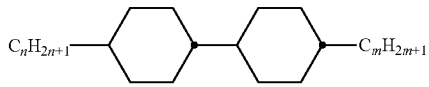

CC-n-m

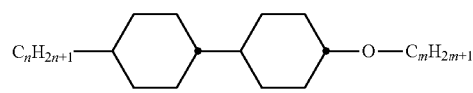

CC-n-Om

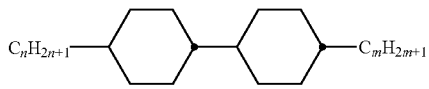

CC-n-m

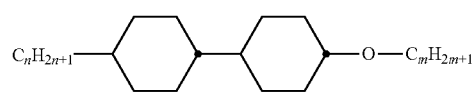

CC-n-Om

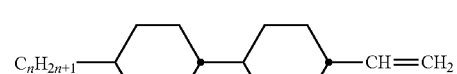

CC-n-V

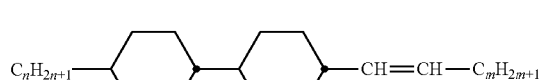

CC-n-Vm

TABLE D-continued
Illustrative structures
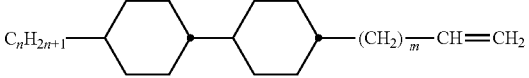
CC-n-mV
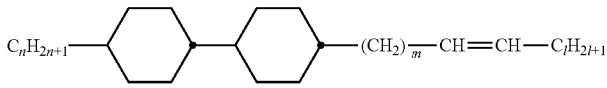
CC-n-mVI
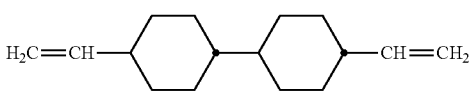
CC-V-V
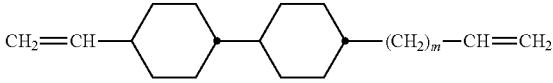
CC-V-mV
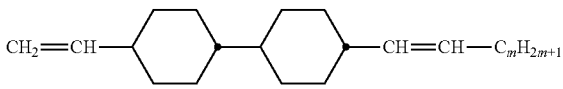
CC-V-Vm
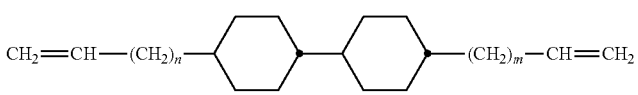
CC-Vn-mV
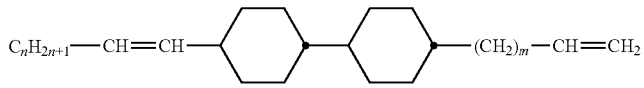
CC-nV-mV
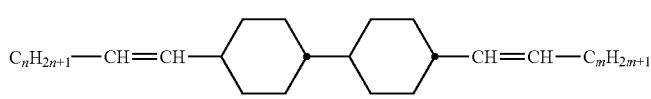
CC-nV-mV
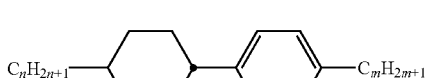
CP-n-m
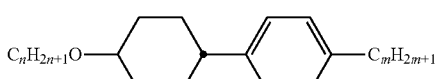
CP-nO-m TABLE D-continued
Illustrative structures
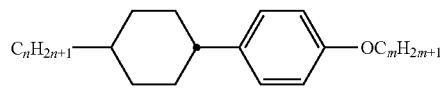
CP-n-Om
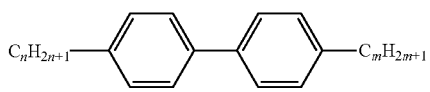
PP-n-m
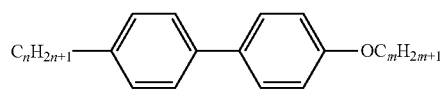
PP-n-Om
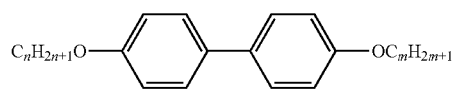
PP-nO-Om
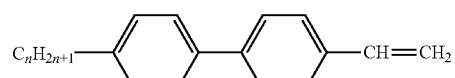
PP-n-V
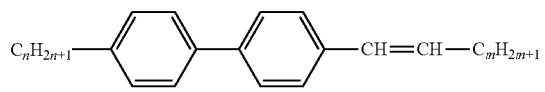
PP-n-Vm
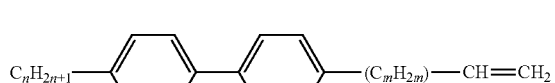
PP-n-mV
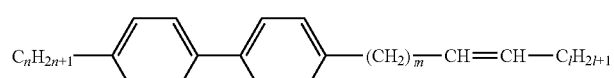
PP-n-mVl
CCP-n-m
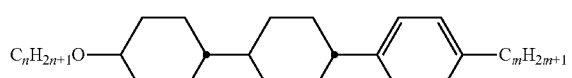
CCP-nO-m TABLE D-continued
Illustrative structures
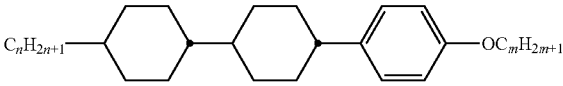
CCP-n-Om
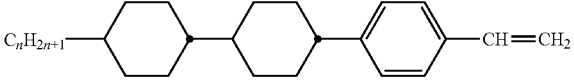
CCP-n-V
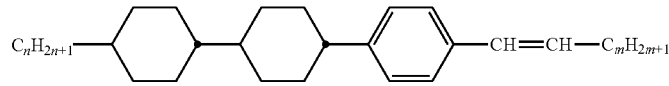
CCP-n-Vm
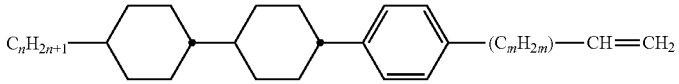
CCP-n-mV
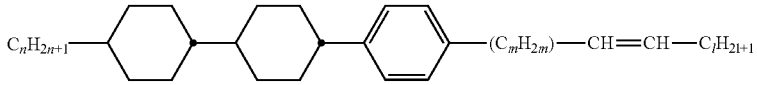
CCP-n-mVl
CCP-V-m
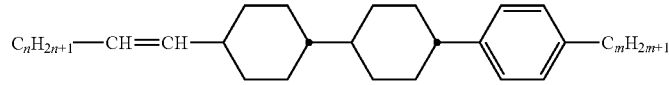
CCP-nV-m
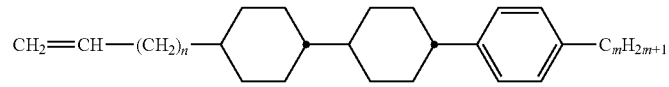
CCP-Vn-m
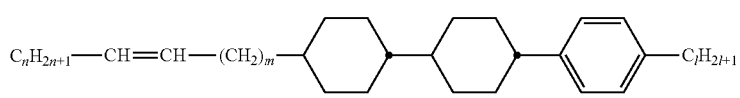
CCP-nVm-I
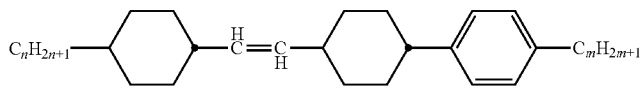
CVCP-n-m TABLE D-continued
Illustrative structures
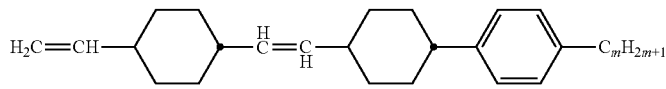
CVCP-V-m
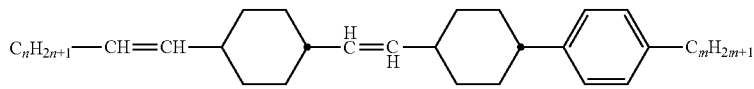
CVCP-nV-m
CPP-n-m
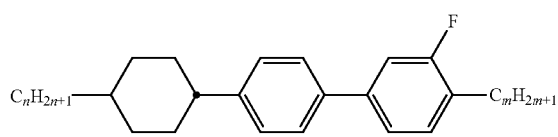
CPG-n-m
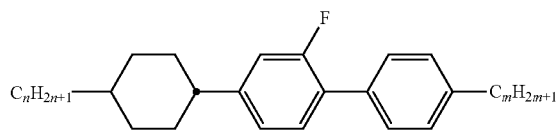
CGP-n-m
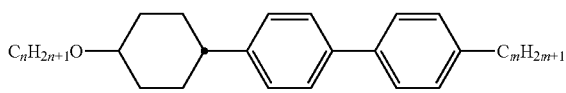
CPP-nO-m
CPP-n-Om
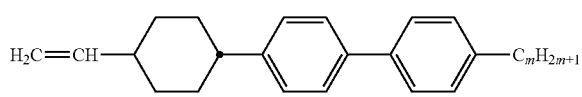
CPP-V-m
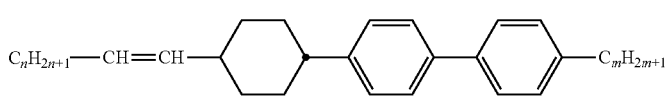
CPP-nV-m
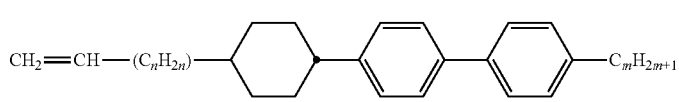
CPPV-n-m TABLE D-continued
Illustrative structures
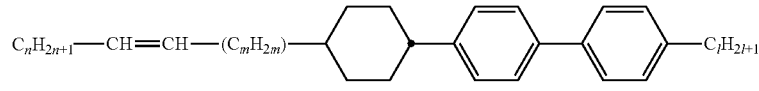
CPP-nVm-I
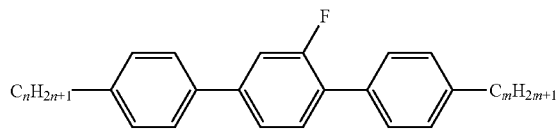
PGP-n-m
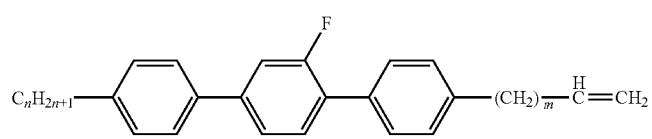
PGP-n-mV
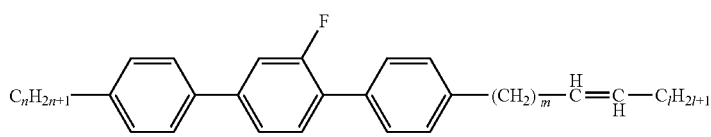
PGP-n-mVI
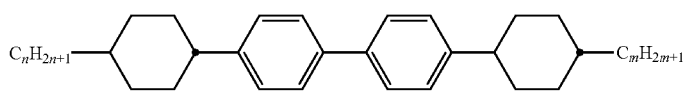
CPPC-n-m
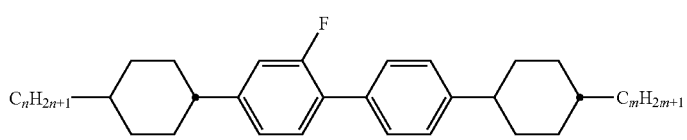
CGPC-n-m
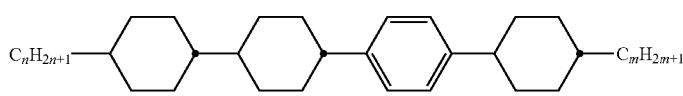
CCPC-n-m
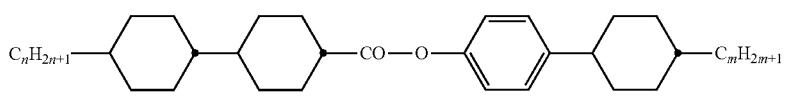
CCZPC-n-m
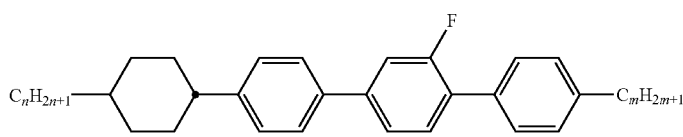
CPGP-n-m TABLE D-continued
Illustrative structures
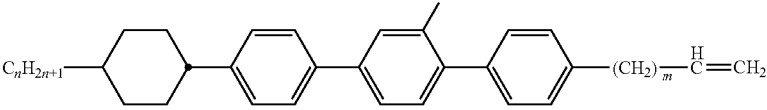
CPGP-n-mV
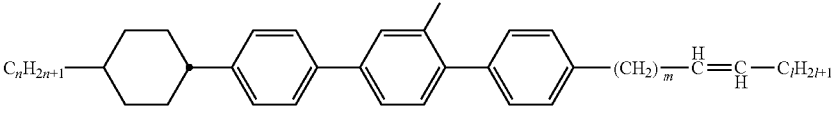
CPGP-n-mVI
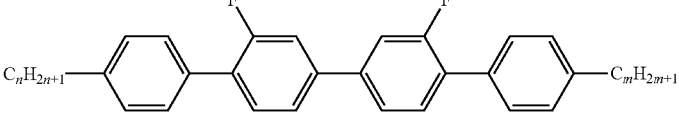
PGIGP-n-m
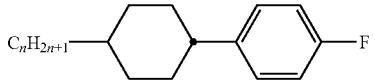
CP-n-F
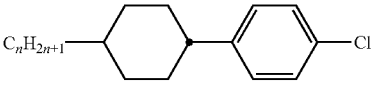
CP-n-CL
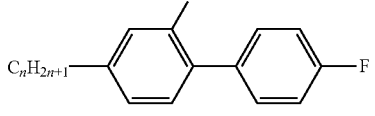
GP-n-F
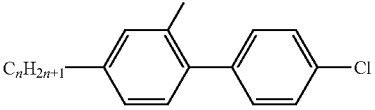
GP-n-CL
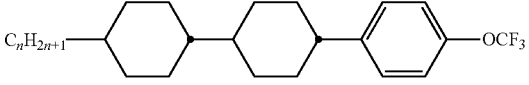
CCP-n-OT
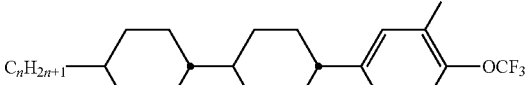
CCG-n-OT TABLE D-continued
Illustrative structures
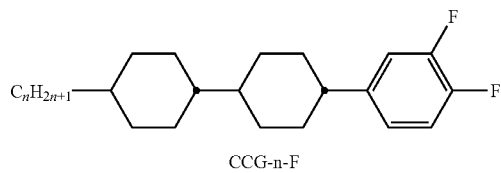
CCG-n-F
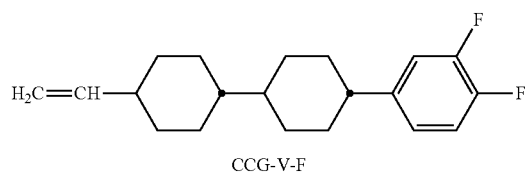
CCG-V-F
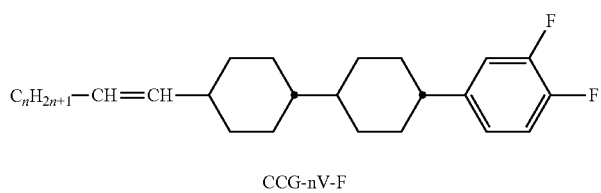
CCG-nV-F
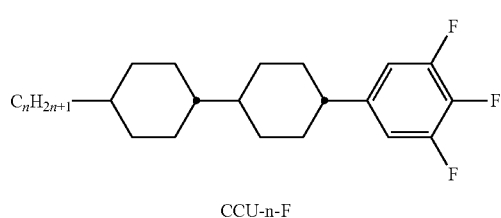
CCU-n-F
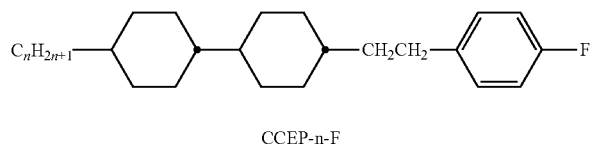
CCEP-n-F
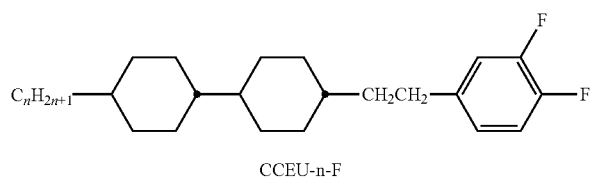
CCEU-n-F
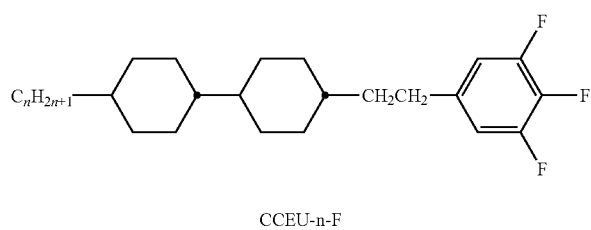
CCEU-n-F TABLE D-continued
Illustrative structures
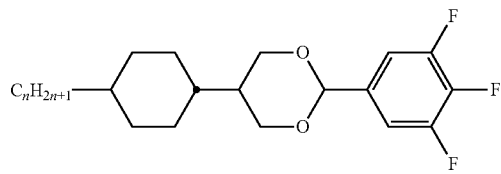
CDU-n-F
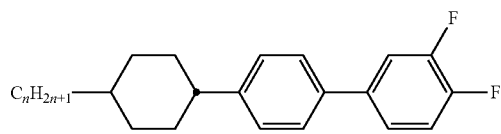
CPG-n-F
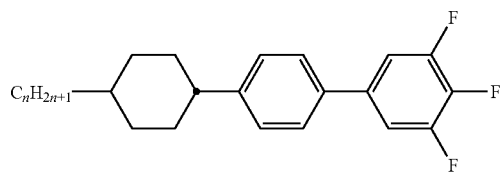
CPU-n-F
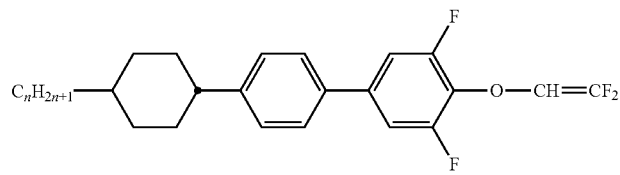
CPU-n-OXF
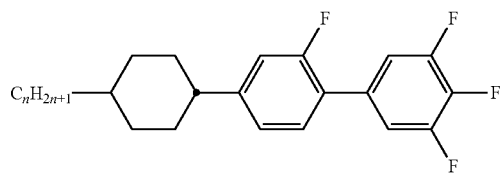
CGU-n-F
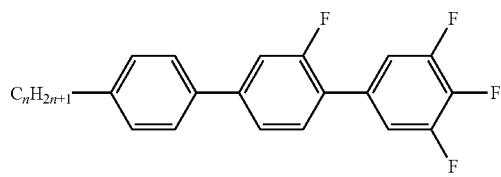
PGU-n-F
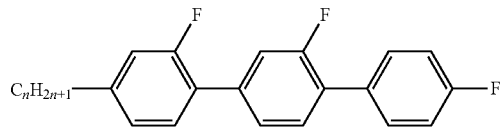
GGP-n-F TABLE D-continued
Illustrative structures
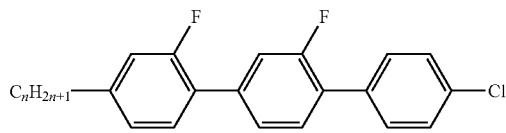
GGP-n-CL
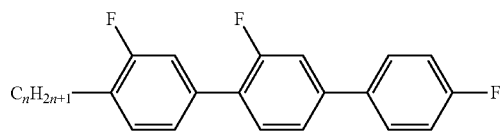
PGIGI-n-F
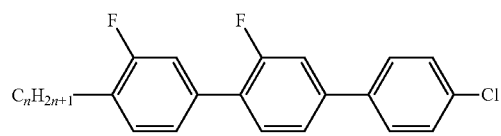
PGIGI-n-CL
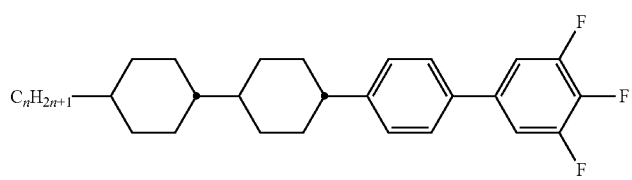
CCPU-n-F
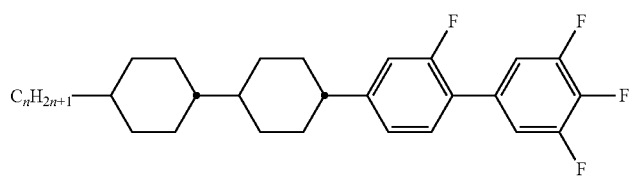
CCGU-n-F
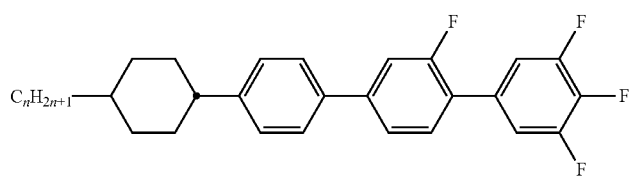
CPGU-n-F
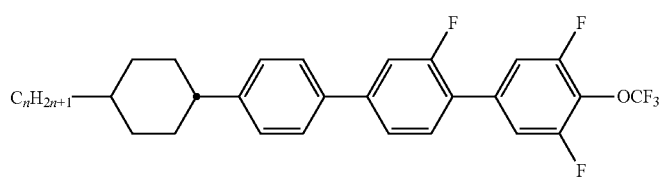
CPGU-n-OT TABLE D-continued
Illustrative structures
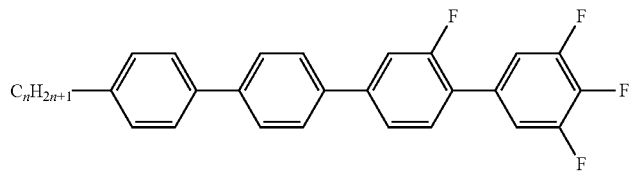
PPGU-n-F
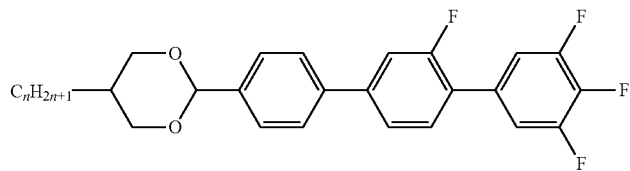
DPGU-n-F
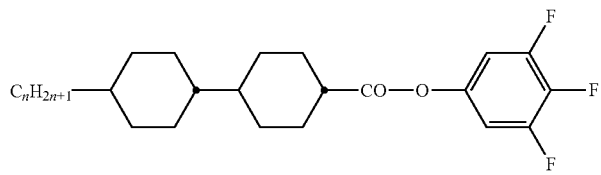
CCZU-n-F
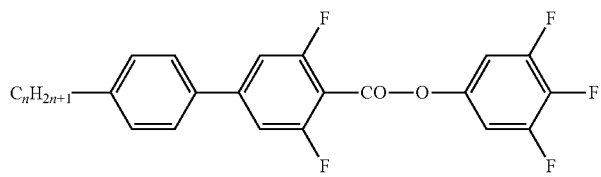
PUZU-n-F
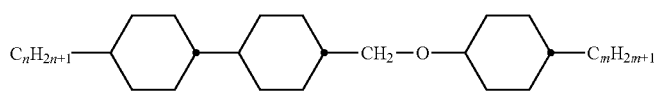
CCOC-n-m
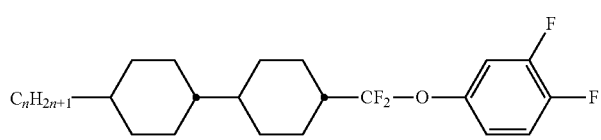
CCQG-n-F
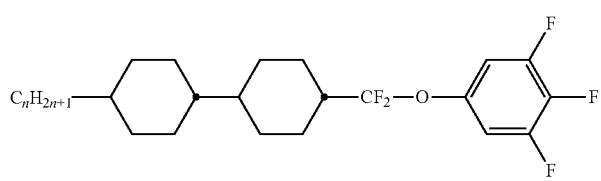
CCQU-n-F TABLE D-continued
Illustrative structures
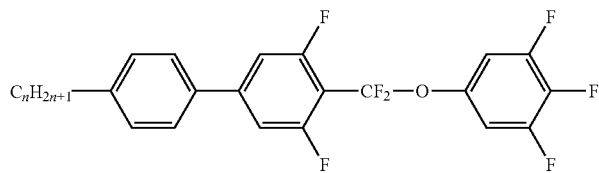
PUQU-n-F
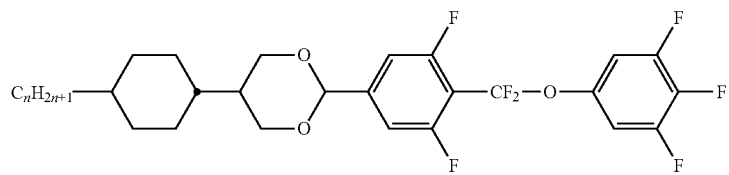
CDUQU-n-F
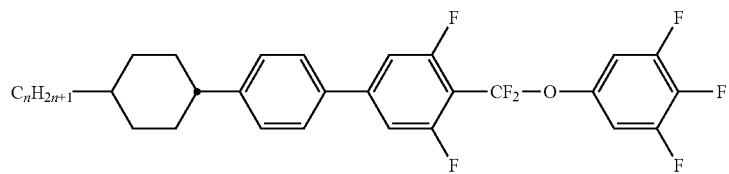
CPUQU-n-F
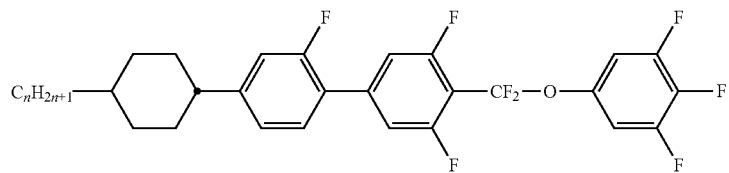
CGUQU-n-F
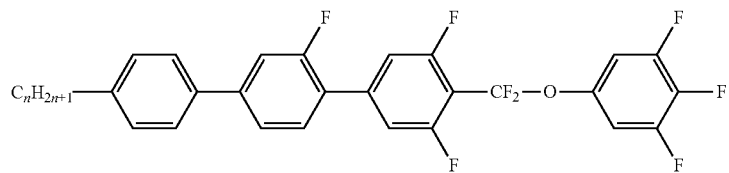
PGUQU-n-F
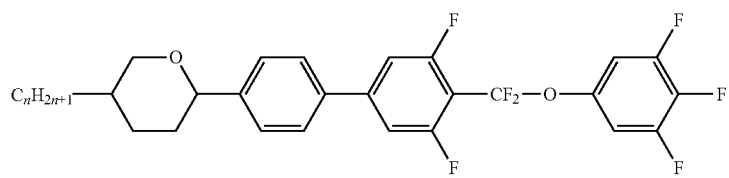
APUQU-n-F TABLE D-continued
Illustrative structures
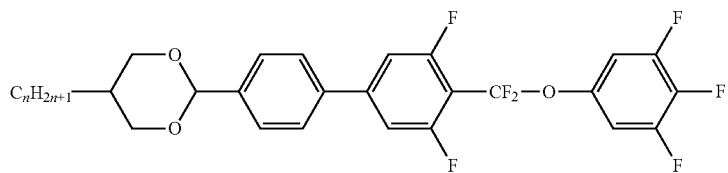
DPUQU-n-F
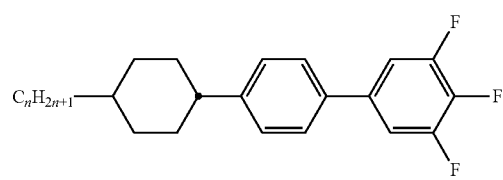
CPU-n-F
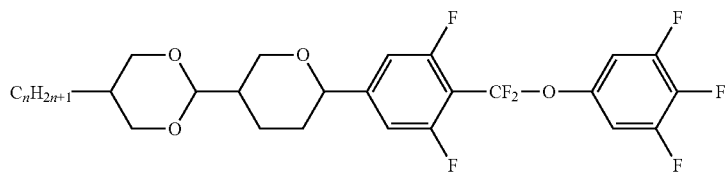
DAUQU-n-F
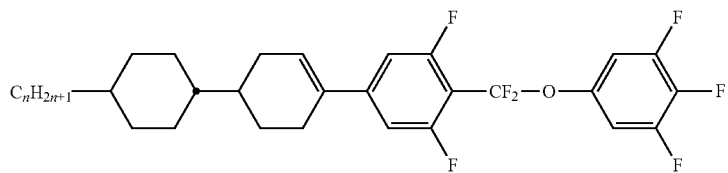
CLUQU-n-F
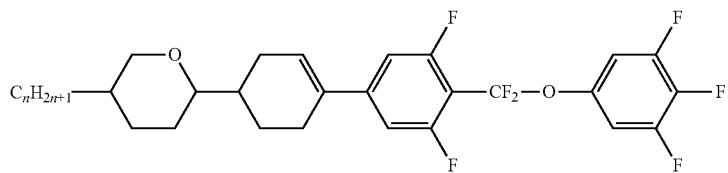
ALUQU-n-F
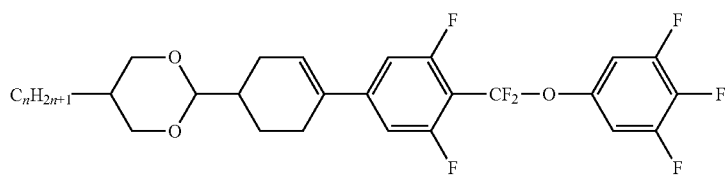
DLUQU-n-F TABLE D-continued
Illustrative structures
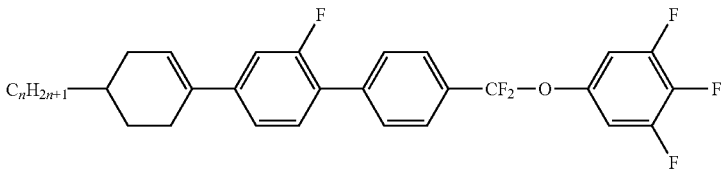
LGPQU-n-F
The following table, Table E, shows illustrative compounds which can be used as stabiliser in the mesogenic media in accordance with the present invention.
TABLE E
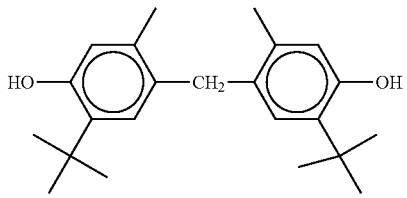
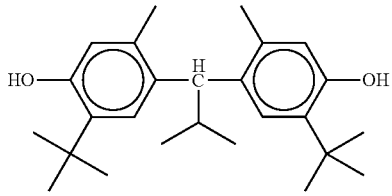
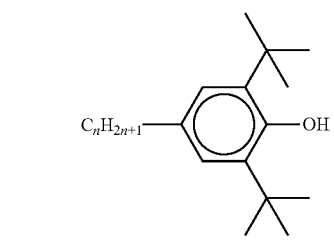
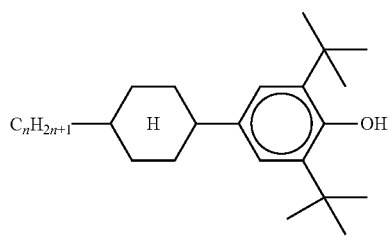
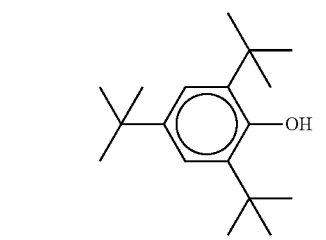
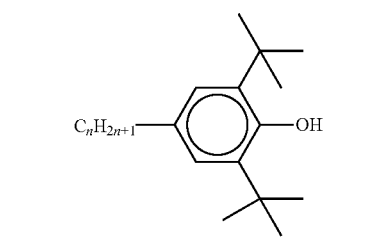
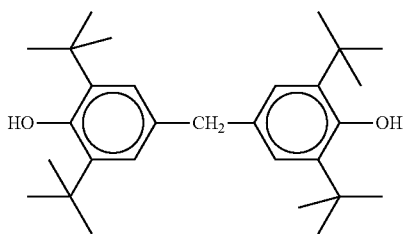
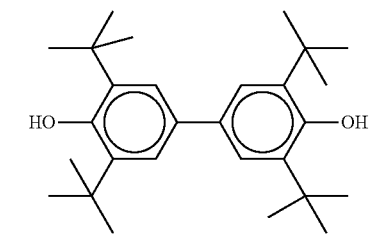
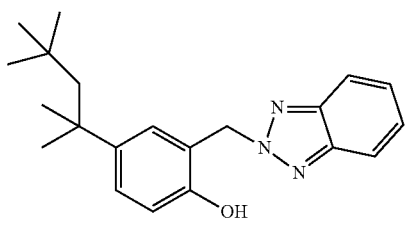 [SMILES: CC(C)(C)CC(C)(C)c1ccc(O)c(Cn2nc3ccccc3n2)c1]
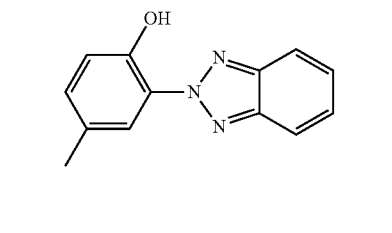 [SMILES: Cc1ccc(O)c(-n2nc3ccccc3n2)c1]

TABLE E-continued
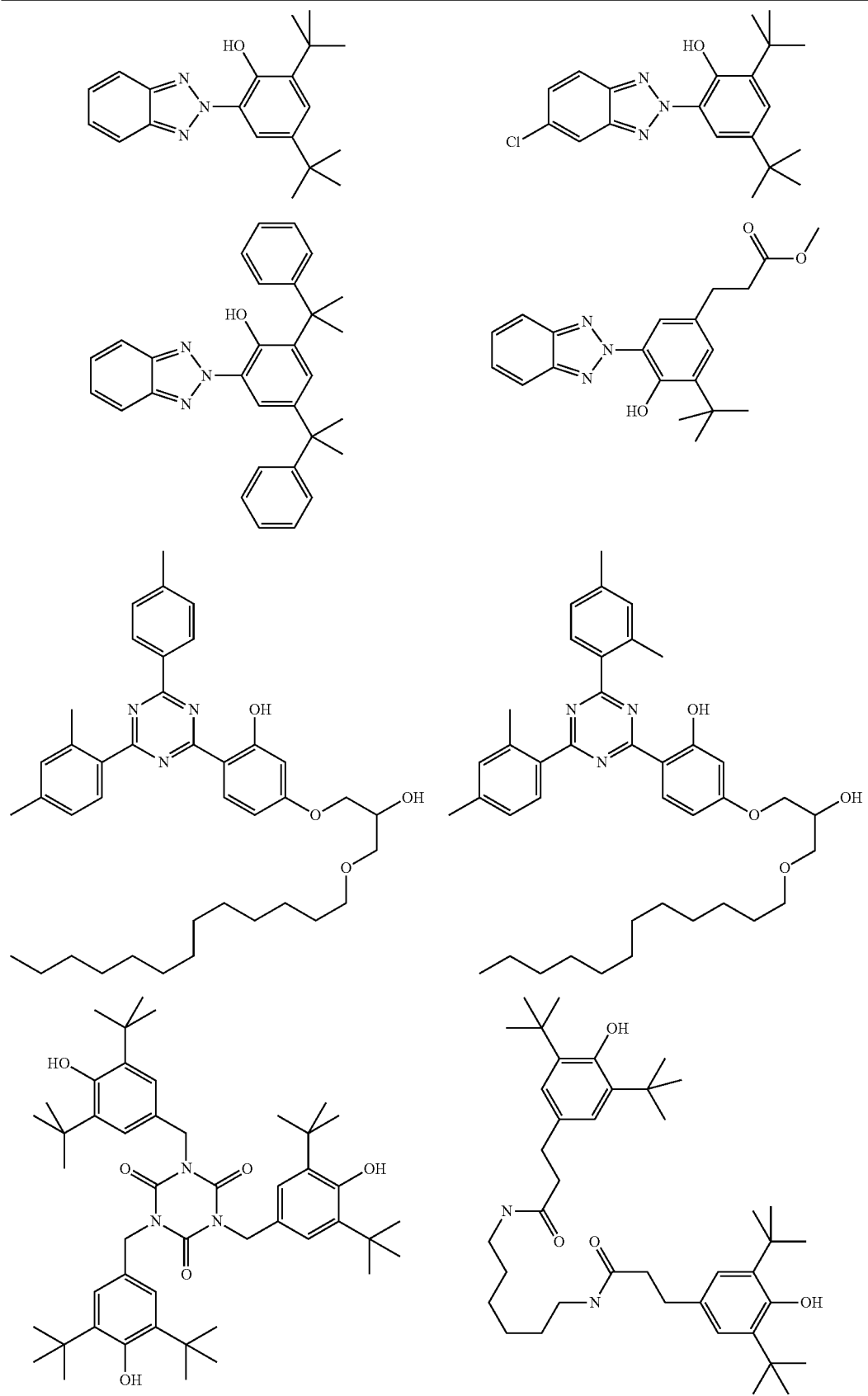

TABLE E-continued
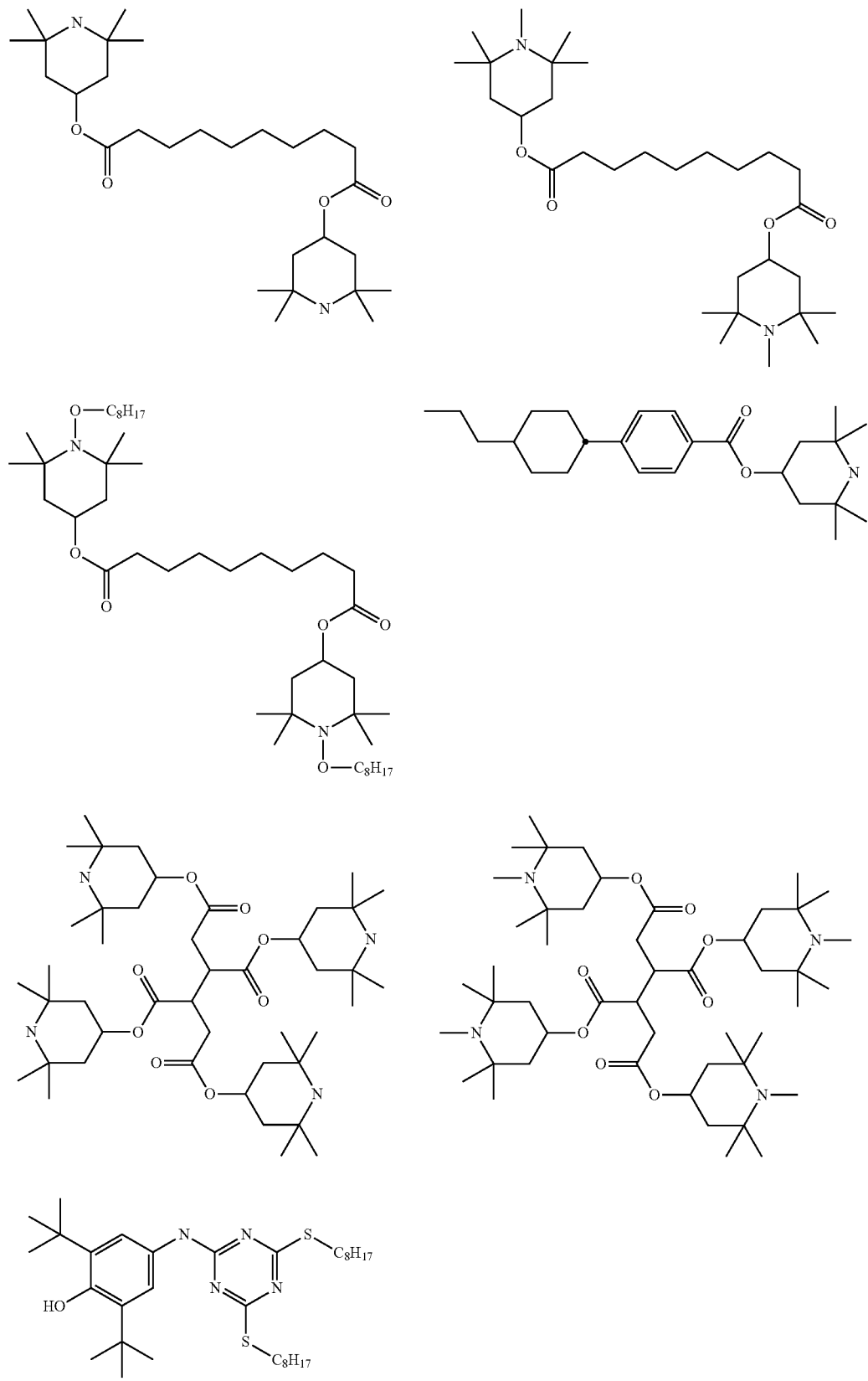

In a preferred embodiment of the present invention, the mesogenic media comprise one or more compounds selected from the group of the compounds from Table E.
The following table, Table F, shows illustrative compounds which can preferably be used as chiral dopants in the mesogenic media in accordance with the present invention.
TABLE F
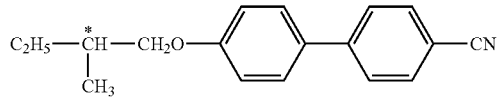
C 15
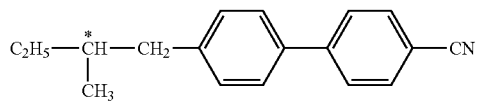
CB 15
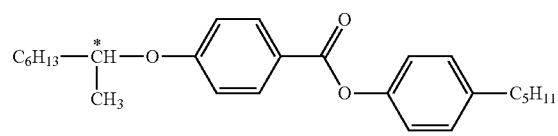
CM 21
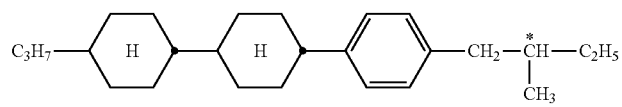
CM 44
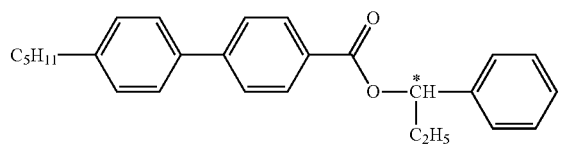
CM 45
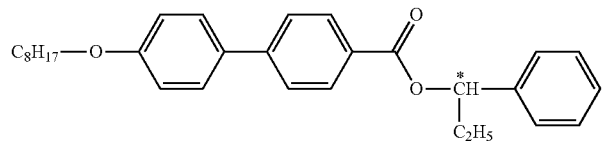
CM 47
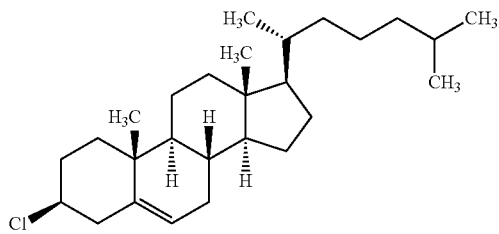
CC TABLE F-continued
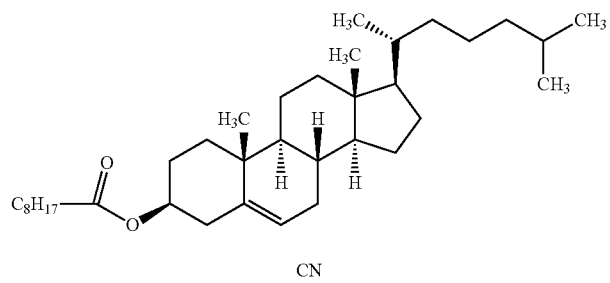
CN
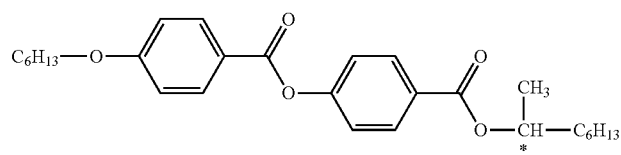
R/S-811
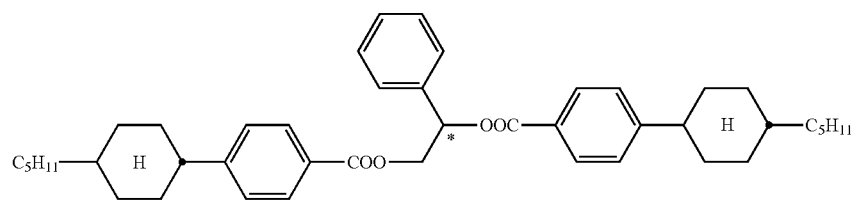
R/S-1011
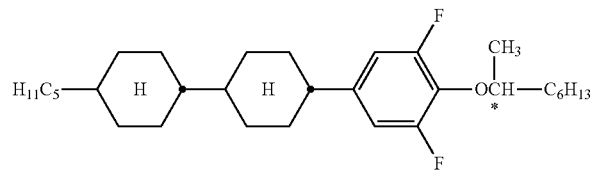
R/S-2011
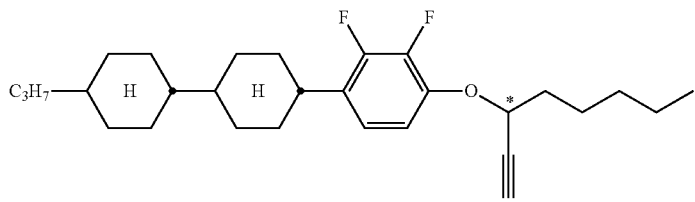
R/S-3011
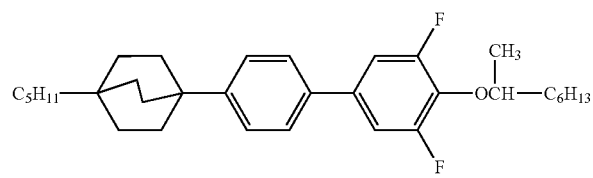
R/S-4011

TABLE F-continued

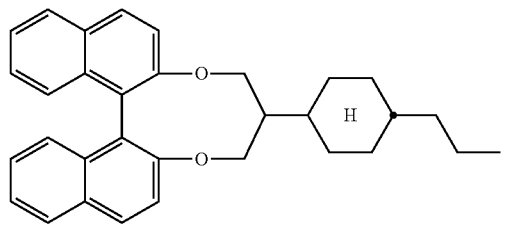

R/S-5011

In a preferred embodiment of the present invention, the mesogenic media comprise one or more compounds selected from the group of the compounds from Table F.

The following table, Table G, shows illustrative compounds which can be used in the mesogenic media in accordance with the present invention, preferably as reactive, mesogenic compounds.

Compounds of Formula I

RM-1
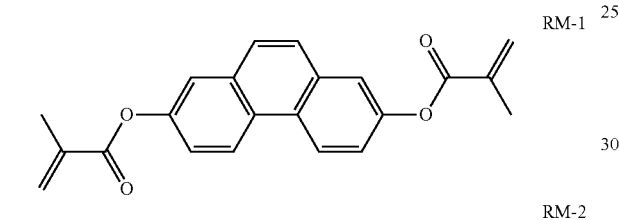

RM-2
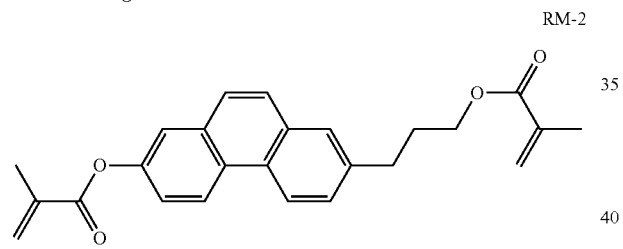

RM-3
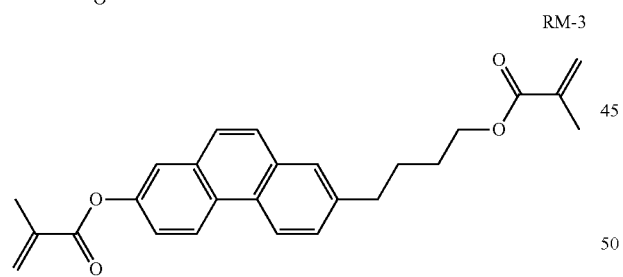

-continued

RM-4
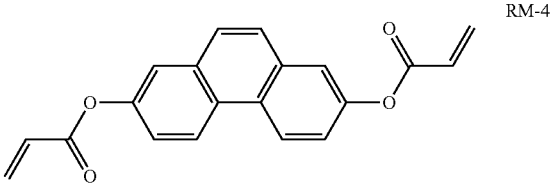

RM-5
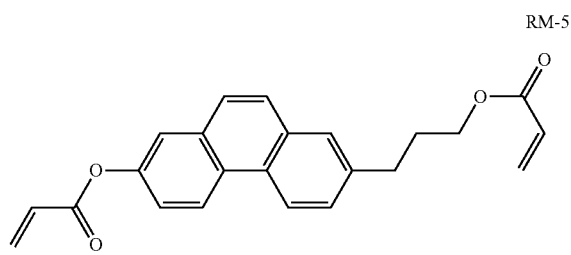

RM-6
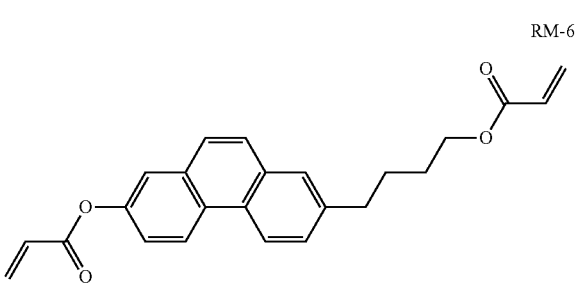

Further Reactive Compounds

RMA-1
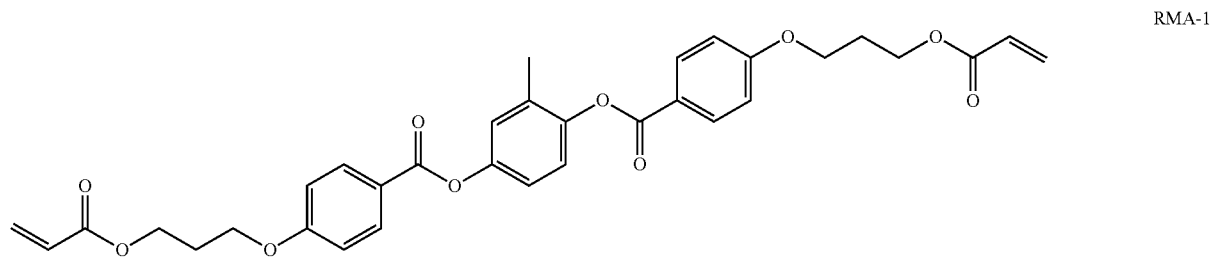

-continued
RMA-2
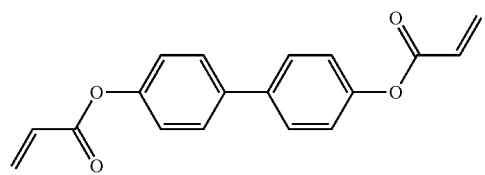
RMA-3
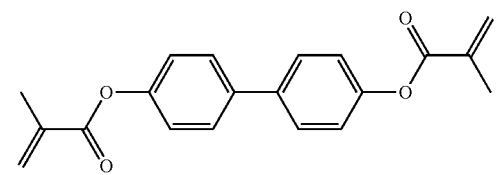
RMA-4
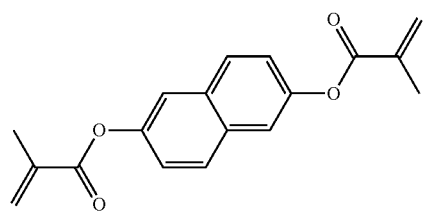
RMA-5
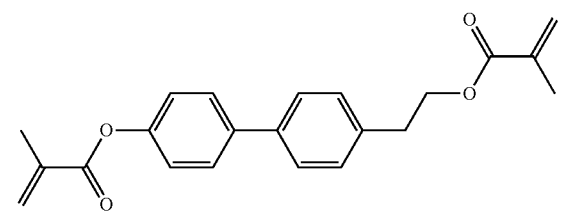
RMA-6
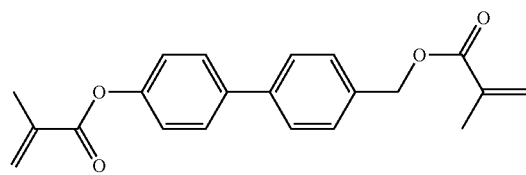
RMA-7
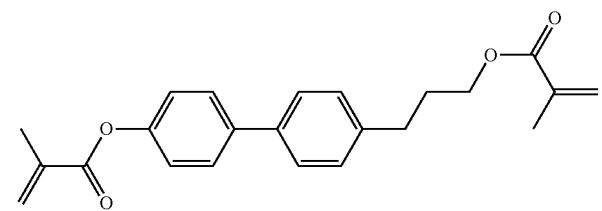
RMA-8
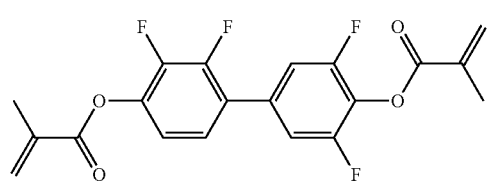
RMA-9
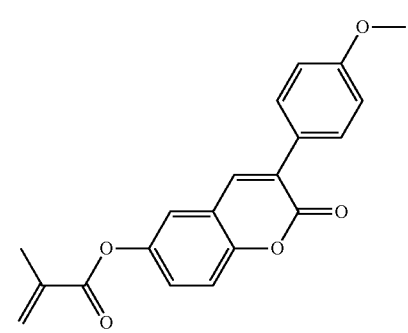
RMA-10
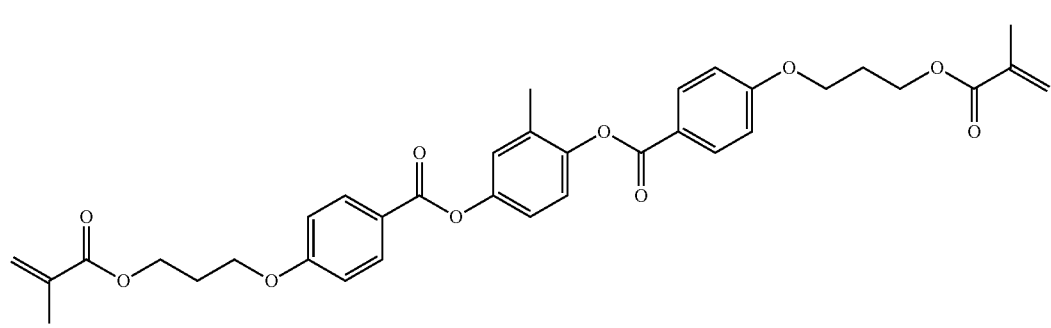

-continued

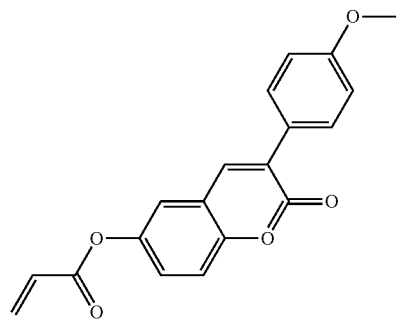
RMA-11

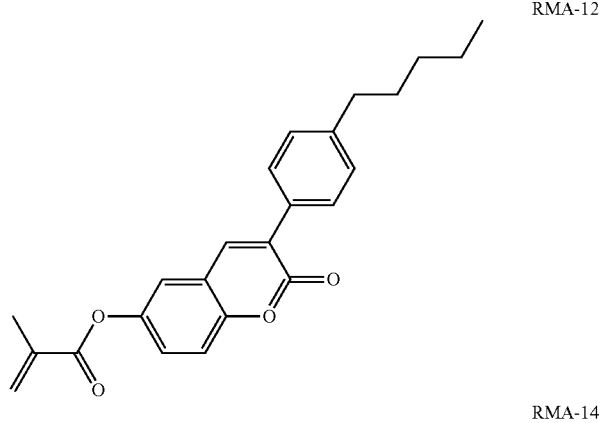
RMA-12

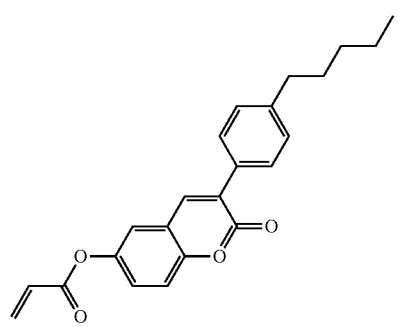
RMA-13

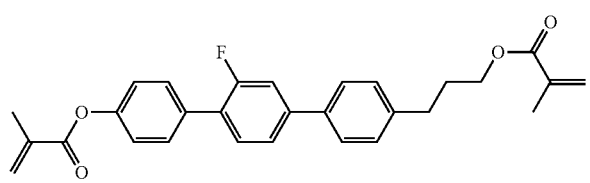
RMA-14

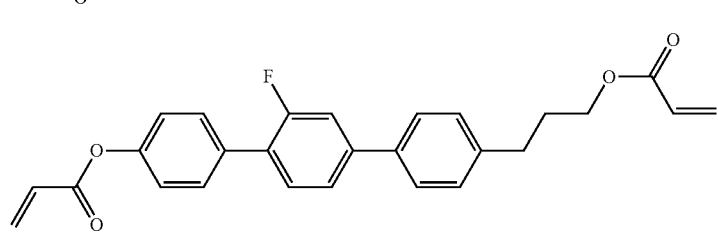
RMA-15

In a preferred embodiment of the present invention, the mesogenic media comprise one or more compounds selected from the group of the compounds from Table G.

The mesogenic media in accordance with the present application preferably comprise two or more, preferably four or more, compounds selected from the group consisting of the compounds from the above tables.

The liquid-crystal media in accordance with the present invention preferably comprise
- seven or more, preferably eight or more, compounds, preferably compounds having three or more, preferably four or more, different formulae, selected from the group of the compounds from Table D, and/or
- one or more, preferably two or more, compounds having different formulae, selected from the group of the compounds from Table G.

EXAMPLES

The following examples explain the present invention without restricting it in any way. However, they show the person skilled in the art preferred mixture concepts with compounds to be employed preferably and the respective concentrations thereof and combinations thereof with one another.

The physical properties make it clear to the person skilled in the art what properties are to be achieved and in what ranges they can be modified. In particular, the combination of the various properties which can preferably be achieved is thus illustrated for the person skilled in the art.

Example 1

A liquid-crystal mixture (A) having the composition and properties as indicated in the following table is prepared.

TABLE 1

Composition and properties of mixture A

| No. | Composition Compound Abbreviation | c/% |
|---|---|---|
| 1 | PUQU-3-F | 8.0 |
| 2 | CCG-V-F | 8.0 |
| 3 | CCU-3-F | 3.0 |
| 4 | CPU-3-F | 8.5 |
| 5 | CGU-3-F | 8.0 |
| 6 | PGU-3-F | 3.5 |
| 7 | CCGU-3-F | 6.0 |
| 8 | CC-3-V | 25.0 |
| 9 | CC-3-V1 | 5.0 |

TABLE 1-continued

Composition and properties of mixture A

| 10 | CCP-V-1 | 13.0 |
|---|---|---|
| 11 | CCP-V2-1 | 12.0 |
| Σ | | 100.0 |

Physical properties

| $T(N, I) =$ | 90.6° C. |
|---|---|
| $n_e(20° C., 589.3 nm) =$ | 1.5894 |
| $\Delta n (20° C., 589.3 nm) =$ | 0.1006 |
| $\epsilon_{\parallel} (20° C., 1 kHz) =$ | 9.7 |
| $\Delta\epsilon (20° C., 1 kHz) =$ | 6.5 |
| $\gamma_1 (20° C.) =$ | 86 mPa·s |
| $k_1 (20° C.) =$ | 12.9 pN |
| $k_3/k_1 (20° C.) =$ | 1.27 |
| $V_0 (20° C.) =$ | t.b.d. V |

Remarks: t.b.d.: to be determined

This mixture is very highly suitable for displays in IPS mode. The mixture is divided into five parts. The first part is introduced directly into an IPS cell and investigated. Alternatively 0.30%, 0.50%, 1.0% and 2.0%, respectively, of the reactive mesogen RM-1 of the formula

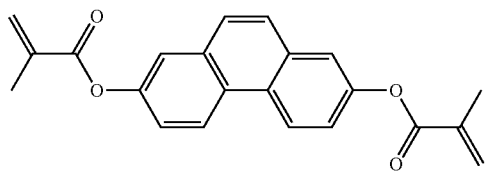 [SMILES: C=C(C)C(=O)Oc1ccc2c(ccc3cc(OC(=O)C(=C)C)ccc32)c1]

is added to each of the four further parts of the mixture. The resultant mixtures are introduced into IPS cells, and the reactive mesogen is polymerised by UV radiation. No initiator is used here. The intensity of irradiation used here is 45 mW/cm², deviating from the standard conditions. In each case a time of irradiation times of 5 minutes is used. During the UV irradiation no voltage is applied to the cells. The cells are subsequently investigated. The results are shown in the following table, table 2.

TABLE 2

Results for mixture A stabilised with various amounts of RM-1

| Example | 1.0 | 1.1 | 1.2 | 1.3 |
|---|---|---|---|---|
| c(RM-1)/% | 0.30 | 0.50 | 1.0 | 2.0 |
| T(N, I)/° C. | 90.5 | 90.6 | 90.8 | 90.9 |

Example 2

A further liquid-crystal mixture (liquid-crystal mixture B) having the composition and properties as indicated in the following table is prepared.

TABLE 3

Composition and properties of mixture B

| No. | Abbreviation | c/% |
|---|---|---|
| 1 | PGUQU-3-F | 2.0 |
| 2 | CPP-3-F | 5.5 |

TABLE 3-continued

Composition and properties of mixture B

| 3 | CPU-3-F | 19.5 |
|---|---|---|
| 4 | PPGU-3-F | 0.5 |
| 5 | CC-3-V | 48.5 |
| 6 | CC-3-V1 | 7.0 |
| 7 | PP-1-2V1 | 7.0 |
| 8 | CPP-3-2 | 3.0 |
| 9 | CPGP-5-2 | 3.0 |
| Σ | | 100.0 |

Physical properties

| $T(N, I) =$ | 70.3° C. |
|---|---|
| $n_e(20° C., 589.3 nm) =$ | 1.5873 |
| $\Delta n (20° C., 589.3 nm) =$ | 0.0992 |
| $\epsilon_{\parallel} (20° C., 1 kHz) =$ | 5.7 |
| $\Delta\epsilon (20° C., 1 kHz) =$ | 3.1 |
| $\gamma_1 (20° C.) =$ | 53 mPa·s |
| $k_1 (20° C.) =$ | 13.2 pN |
| $k_3/k_1 (20° C.) =$ | 1.07 |
| $V_0 (20° C.) =$ | 2.13 V |

This mixture is very highly suitable for displays in IPS- and in FFS mode. As in Example 1, the mixture is divided into parts, here it is divided into four parts. The first part is introduced directly into an FFS cell (layer thickness 3.6 µm, W=4.0 µm, L=6.0 µm, tilt angle 2°, slit angle 10°) and investigated. Alternatively 0.30%, 0.50% and 1.0%, respectively, of the reactive mesogen RM-1, used already in example 1, is added to each of the three further parts of the mixture. Also here no photoinitiator is added. The resultant mixtures are introduced into FFS cells, and the reactive mesogen is polymerised by UV radiation. No initiator is used. The intensity of irradiation here is 50 mW/cm² in accordance with the standard conditions and the irradiation is applied for a time of 5 minutes. During the UV irradiation no voltage is applied to the cells. The cells are subsequently investigated. The results are shown in the following table, table 4.

TABLE 4

Results for mixture B stabilised with various amounts of RM-1

| Example | C2 | 2.0 | 1.1 | 1.2 |
|---|---|---|---|---|
| c(RM-1)/% | 0 | 0.30 | 0.50 | 1.0 |
| T(N, I)/° C. | 70.3 | 70.2 | 70.3 | 70.5 |

Example 3

A further liquid-crystal mixture (liquid-crystal mixture C) having the composition and properties as indicated in the following table is prepared.

TABLE 5

Composition and properties of mixture C

Composition Compound

| No. | Abbreviation | c/% |
|---|---|---|
| 1 | PGUQU-3-F | 2.01 |
| 2 | CPP-3-F | 5.53 |
| 3 | CPU-3-F | 19.60 |
| 4 | CC-3-V | 48.74 |
| 5 | CC-3-V1 | 4.03 |

TABLE 5-continued

| Composition and properties of mixture C | | |
|---|---|---|
| 6 | PP-1-2V1 | 7.04 |
| 7 | CPP-3-2 | 7.03 |
| 8 | CPGP-5-2 | 3.02 |
| Σ | | 100.00 |

| Physical properties | |
|---|---|
| T(N, I) = | 69.5° C. |
| $n_e$(20° C., 589.3 nm) = | 1.5862 |
| Δn (20° C., 589.3 nm) = | 0.0982 |
| $\epsilon_{\|\|}$ (20° C., 1 kHz) = | 5.6 |
| Δε (20° C., 1 kHz) = | 3.0 |
| $\gamma_1$ (20° C.) = | 51 mPa·s |
| $k_1$ (20° C.) = | t.b.d. pN |
| $k_3/k_1$(20° C.) = | t.b.d. |
| $V_0$ (20° C.) = | t.b.d. V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 6.

TABLE 6

Results for mixture C stabilised with various amounts of RM-1

| Example | C3 | 3.1 | 3.2 | 3.3 |
|---|---|---|---|---|
| c(RM-1)/% | 0 | 0.30 | 0.50 | 1.0 |
| T(N, I)/° C. | 69.5 | 69.7 | 69.8 | 70.0 |

Example 4

A further liquid-crystal mixture (liquid-crystal mixture D) having the composition and properties as indicated in the following table is prepared.

TABLE 7

| Composition and properties of mixture D | | |
|---|---|---|
| Composition Compound | | |
| No. | Abbreviation | c/% |
| 1 | APUQU-2-F | 3.0 |
| 2 | APUQU-3-F | 6.0 |
| 3 | CCQU-3-F | 8.0 |
| 4 | CCQU-5-F | 4.0 |
| 5 | PUQU-3-F | 13.5 |
| 6 | PGUQU-3-F | 5.0 |
| 7 | CPP-2-F | 2.0 |
| 8 | CPP-3-F | 7.5 |
| 9 | PPGU-3-F | 0.5 |
| 10 | CC-3-V | 25.5 |
| 11 | CC-3-V1 | 6.0 |
| 12 | CCP-V-1 | 13.0 |
| 13 | CCP-V2-1 | 6.0 |
| Σ | | 100.0 |

| Physical properties | |
|---|---|
| T(N, I) = | 84.8° C. |
| $n_e$(20° C., 589.3 nm) = | 1.5876 |
| Δn (20° C., 589.3 nm) = | 0.1035 |
| $\epsilon_{\|\|}$ (20° C., 1 kHz) = | 13.5 |
| Δε (20° C., 1 kHz) = | 10.1 |
| $\gamma_1$ (20° C.) = | 86 mPa·s |

TABLE 7-continued

| Composition and properties of mixture D | |
|---|---|
| $k_1$ (20° C.) = | 12.3 pN |
| $k_3/k_1$(20° C.) = | 1.22 |
| $V_0$ (20° C.) = | 1.17 V |

This mixture is very highly suitable for displays in IPS mode. As in Example 1, the mixture is divided into ten parts. The respective parts are treated and investigated as described in example 1. However, here 0.10, 0.15, 0.20, 0.25, 0.30, 0.50, 1.0, 2.0 and 3.0%, respectively, of the reactive mesogen RM-1, used already in example 1, is added to each of the four further parts of the mixture. Here, additionally, the stability of the resultant mixtures against storage in the bulk in sealed bottles at low temperatures is investigated. The results are shown in the following table, table 8.

TABLE 8

Results for mixture D stabilised with various amounts of RM-1

| Example | C4 | 4.1 | 4.2 | 4.3 | 4.4 |
|---|---|---|---|---|---|
| c(RM-1)/% | 0 | 0.10 | 0.15 | 0.20 | 0.25 |
| T(N, I)/° C. | 84.8 | 84.8 | t.b.d. | t.b.d. | 84.7 |
| LT(−20° C.)/h | t.b.d. | >1,000 | t.b.d. | t.b.d. | t.b.d. |
| LT(−30° C.)/h | t.b.d. | >1,000 | t.b.d. | t.b.d. | t.b.d. |

| Example | 4.5 | 4.6 | 4.7 | 4.8 | 4.9 |
|---|---|---|---|---|---|
| c(RM-1)/% | 0.30 | 0.50 | 1.0 | 2.0 | 3.0 |
| T(N, I)/° C. | 84.7 | t.b.d. | t.b.d. | t.b.d. | t.b.d. |
| LT(−20° C.)/h | >1,000 | >750 | t.b.d. | t.b.d. | t.b.d. |
| LT(−30° C.)/h | >1,000 | >750 | t.b.d. | t.b.d. | t.b.d. |

Remarks: t.b.d.: to be determined
LT: Stability at low temperature

Example 5

A further liquid-crystal mixture (liquid-crystal mixture E) having the composition and properties as indicated in the following table is prepared.

TABLE 9

| Composition and properties of mixture E | | |
|---|---|---|
| Composition Compound | | |
| No. | Abbreviation | c/% |
| 1 | APUQU-2-F | 4.0 |
| 2 | APUQU-3-F | 6.0 |
| 3 | CCQU-3-F | 3.0 |
| 4 | CCQU-5-F | 5.5 |
| 5 | PUQU-3-F | 11.0 |
| 6 | PGUQU-3-F | 4.0 |
| 7 | PGUQU-4-F | 2.0 |
| 8 | PGUQU-5-F | 2.0 |
| 9 | CCEP-3-F | 15.0 |
| 10 | CPGU-3-OT | 3.0 |
| 11 | PPGU-3-F | 0.5 |

TABLE 9-continued

| Composition and properties of mixture E | | |
|---|---|---|
| 12 | CC-3-V | 28.5 |
| 13 | CC-3-V1 | 8.0 |
| 14 | CCP-V-1 | 7.5 |
| Σ | | 100.0 |

| Physical properties | |
|---|---|
| $T(N, I) =$ | 83.8° C. |
| $n_e(20°\ C., 589.3\ nm) =$ | 1.5787 |
| $\Delta n\ (20°\ C., 589.3\ nm) =$ | 0.0996 |
| $\epsilon_{\parallel}\ (20°\ C., 1\ kHz) =$ | 14.5 |
| $\Delta\epsilon\ (20°\ C., 1\ kHz) =$ | 11.0 |
| $\gamma_1\ (20°\ C.) =$ | 92 mPa·s |
| $k_1\ (20°\ C.) =$ | 15.2 pN |
| $k_3/k_1(20°\ C.) =$ | 1.16 |
| $V_0\ (20°\ C.) =$ | 1.15 V |

This mixture is very highly suitable for displays in IPS mode. As in Example 2, the mixture is divided into four parts. The respective parts are treated and investigated as described in example 2. The results are shown in the following table, table 10.

TABLE 10

Results for mixture E stabilised with various amounts of RM-1

| Example | C5 | 5.1 | 5.2 | 5.3 |
|---|---|---|---|---|
| c(RM-1)/% | 0 | 0.25 | 0.50 | 1.0 |
| T(N, I)/° C. | 83.8 | t.b.d. | t.b.d. | t.b.d. |

Remarks: t.b.d.: to be determined

Example 6

A further liquid-crystal mixture (liquid-crystal mixture F) having the composition and properties as indicated in the following table is prepared.

TABLE 11

| Composition and properties of mixture F | | |
|---|---|---|
| Composition | | |
| Compound | | |
| No. | Abbreviation | c/% |
| 1 | APUQU-2-F | 4.0 |
| 2 | APUQU-3-F | 6.0 |
| 3 | CCQU-5-F | 8.0 |
| 4 | PUQU-3-F | 15.0 |
| 5 | CCEP-3-F | 11.0 |
| 6 | CCU-3-F | 9.0 |
| 7 | CPGU-3-OT | 3.0 |
| 8 | PPGU-3-F | 0.5 |
| 9 | CC-3-V | 25.0 |
| 10 | CC-3-V1 | 8.0 |
| 11 | CCP-V-1 | 9.5 |
| Σ | | 100.0 |

| Physical properties | |
|---|---|
| $T(N, I) =$ | 82.2° C. |
| $n_e(20°\ C., 589.3\ nm) =$ | 1.5734 |
| $\Delta n\ (20°\ C., 589.3\ nm) =$ | 0.0946 |
| $\epsilon_{\parallel}\ (20°\ C., 1\ kHz) =$ | 13.8 |
| $\Delta\epsilon\ (20°\ C., 1\ kHz) =$ | 10.3 |
| $\gamma_1\ (20°\ C.) =$ | 92 mPa·s |
| $k_1\ (20°\ C.) =$ | 12.4 pN |

TABLE 11-continued

| Composition and properties of mixture F | |
|---|---|
| $k_3/k_1(20°\ C.) =$ | 1.19 |
| $V_0\ (20°\ C.) =$ | t.b.d. V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 12.

TABLE 12

Results for mixture F stabilised with various amounts of RM-1

| Example | C6 | 6.1 | 6.2 | 6.3 |
|---|---|---|---|---|
| c(RM-1)/% | 0 | 0.25 | 0.50 | 1.0 |
| T(N, I)/° C. | 82.2 | t.b.d. | t.b.d. | t.b.d. |

Remarks: t.b.d.: to be determined

Example 7

A further liquid-crystal mixture (liquid-crystal mixture G) having the composition and properties as indicated in the following table is prepared.

TABLE 13

| Composition and properties of mixture G | | |
|---|---|---|
| Composition | | |
| Compound | | |
| No. | Abbreviation | c/% |
| 1 | APUQU-3-F | 5.5 |
| 2 | CCQU-5-F | |
| 3 | PUQU-3-F | 14.0 |
| 4 | CCP-3-OT | 2.5 |
| 5 | PGU-2-F | 3.0 |
| 6 | CPGU-3-OT | 4.0 |
| 7 | DPGU-4-F | 3.0 |
| 8 | CC-3-V | 33.5 |
| 9 | CC-3-V1 | 10.0 |
| 10 | CCP-V-1 | 13.0 |
| 11 | CCP-V2-1 | 6.0 |
| 12 | PGP-2-2V | 2.0 |
| 13 | CPPC-3-3 | 9.5 |
| Σ | | 100.0 |

| Physical properties | |
|---|---|
| $T(N, I) =$ | 90.3° C. |
| $n_e(20°\ C., 589.3\ nm) =$ | 1.5919 |
| $\Delta n\ (20°\ C., 589.3\ nm) =$ | 0.1062 |
| $\epsilon_{\parallel}\ (20°\ C., 1\ kHz) =$ | 10.5 |
| $\Delta\epsilon\ (20°\ C., 1\ kHz) =$ | 7.4 |
| $\gamma_1\ (20°\ C.) =$ | 73 mPa·s |
| $k_1\ (20°\ C.) =$ | 14.3 pN |
| $k_3/k_1(20°\ C.) =$ | 1.15 |
| $V_{10}\ (20°\ C.) =$ | 1.70 V |
| $V_{90}\ (20°\ C.) =$ | 2.57 V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 14.

TABLE 14

Results for mixture G stabilised with various amounts of RM-1

| Example | C7 | 7.1 | 7.2 | 7.3 |
|---|---|---|---|---|
| c(RM-1)/% | 0 | 0.10 | 0.30 | 0.50 |
| T(N, I)/° C. | 90.3 | t.b.d. | t.b.d. | t.b.d. |

Remarks: t.b.d.: to be determined

Example 8

A further liquid-crystal mixture (liquid-crystal mixture H) having the composition and properties as indicated in the following table is prepared.

TABLE 15

Composition and properties of mixture H

| | Composition Compound | |
|---|---|---|
| No. | Abbreviation | c/% |
| 1 | PUQU-3-F | 10.0 |
| 2 | PGUQU-4-F | 7.0 |
| 3 | CCP-3-OT | 5.0 |
| 4 | PGU-2-F | 5.0 |
| 5 | DPGU-4-F | 6.0 |
| 6 | CPGU-3-OT | 5.0 |
| 7 | PPGU-3-F | 1.0 |
| 8 | CC-3-V | 44.0 |
| 9 | CC-3-V1 | 5.0 |
| 10 | CCP-V-1 | 12.0 |
| Σ | | 100.0 |

| Physical properties | |
|---|---|
| T(N, I) = | 79.8° C. |
| $n_e$(20° C., 589.3 nm) = | 1.5878 |
| Δn (20° C., 589.3 nm) = | 0.1034 |
| ε∥ (20° C., 1 kHz) = | 11.3 |
| Δε (20° C., 1 kHz) = | 8.1 |
| $γ_1$ (20° C.) = | 62 mPa·s |
| $k_1$ (20° C.) = | 12.3 pN |
| $k_3/k_1$(20° C.) = | 1.14 |
| $V_0$ (20° C.) = | t.b.d. V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 16.

TABLE 16

Results for mixture H stabilised with various amounts of RM-1

| Example | C8 | 8.1 | 8.2 | 8.3 |
|---|---|---|---|---|
| c(RM-1)/% | 0 | 0.10 | 0.30 | 0.5 |
| T(N, I)/° C. | 79.8 | t.b.d. | t.b.d. | t.b.d. |

Remarks: t.b.d.: to be determined

Example 9

A further liquid-crystal mixture (liquid-crystal mixture I) having the composition and properties as indicated in the following table is prepared.

TABLE 17

Composition and properties of mixture I

| | Composition Compound | |
|---|---|---|
| No. | Abbreviation | c/% |
| 1 | CCQU-2-F | 8.0 |
| 2 | CCQU-3-F | 8.5 |
| 3 | CCQU-5-F | 8.0 |
| 4 | PUQU-3-F | 6.5 |
| 5 | CCG-V-F | 2.0 |
| 6 | CCU-1-F | 5.5 |
| 7 | CCU-2-F | 7.0 |
| 8 | CCU-3-F | 9.0 |
| 9 | CCU-5-F | 3.0 |
| 10 | CC-3-V | 20.0 |
| 11 | CCP-V-1 | 12.5 |
| 12 | CCP-V2-1 | 10.0 |
| Σ | | 100.0 |

| Physical properties | |
|---|---|
| T(N, I) = | 90.3° C. |
| $n_e$(20° C., 589.3 nm) = | 1.5584 |
| Δn (20° C., 589.3 nm) = | 0.0800 |
| ε∥ (20° C., 1 kHz) = | 13.8 |
| Δε (20° C., 1 kHz) = | 10.3 |
| $γ_1$ (20° C.) = | 98 mPa·s |
| $k_1$ (20° C.) = | 12.3 pN |
| $k_3/k_1$(20° C.) = | 1.137 |
| $V_0$ (20° C.) = | t.b.d. V |

Remarks: t.b.d.: to be determined

This mixture is very highly suitable for displays in IPS mode. As in Example 1, the mixture is divided into several parts. Here however the mixture is divided into six parts. The first part is investigated as such. To the remaining five parts two different reactive mesogens are added. The first one is the reactive mesogen RM-1 used in Example 1, whereas the second one is the compound of the formula RMA-3 as defined above. The ratio of the concentrations of the two reactive mesogens RM-1 and RMA-3 is kept constant at 2.5, while the concentration of RM-1 uses is alternatively 0.25, 0.50, 0.75, 1.00 and 1.25%, respectively. The respective parts are treated and investigated as described in example 1. The results are shown in the following table, table 18.

TABLE 18

Results for mixture I stabilised with various amounts of RM-1

| Example | C9 | 9.1 | 9.2 |
|---|---|---|---|
| c(RM-1)/% | 0 | 0.25 | 0.50 |
| c(RMA-3)/% | 0 | 0.10 | 0.20 |
| T(N, I)/° C. | 90.3 | 90.4 | 90.4 |
| Example | 9.3 | 9.4 | 9.5 |
| c(RM-1)/% | 0.75 | 1.00 | 1.25 |
| c(RMA-3)/% | 0.30 | 0.40 | 0.50 |
| T(N, I)/° C. | 90.5 | 90.5 | 90.5 |

Example 10

A further liquid-crystal mixture (liquid-crystal mixture J) having the composition and properties as indicated in the following table is prepared.

TABLE 19

Composition and properties of mixture J

Composition Compound

| No. | Abbreviation | c/% |
|---|---|---|
| 1 | CCQU-3-F | 10.0 |
| 2 | PUQU-3-F | 11.0 |
| 3 | PGUQU-3-F | 6.0 |
| 4 | PGU-3-F | 7.0 |
| 5 | CCGU-3-F | 8.0 |
| 6 | CC-3-V | 35.0 |
| 7 | CC-3-V1 | 8.0 |
| 8 | CCP-V-1 | 15.0 |
| Σ | | 100.0 |

Physical properties

| | |
|---|---|
| T(N, I) = | 81.3° C. |
| $n_e$(20° C., 589.3 nm) = | 1.5814 |
| Δn (20° C., 589.3 nm) = | 0.0989 |
| $\epsilon\|\|$ (20° C., 1 kHz) = | 11.1 |
| Δε (20° C., 1 kHz) = | 7.9 |
| $\gamma_1$ (20° C.) = | 76 mPa·s |
| $k_1$ (20° C.) = | 12.2 pN |
| $k_3/k_1$(20° C.) = | 1.26 |
| $V_0$ (20° C.) = | t.b.d. V |

Remarks: t.b.d.: to be determined

This mixture is very highly suitable for displays in IPS mode. As in Example 4, the mixture is divided into 10 parts. The respective parts are treated and investigated as described in example 4. The results are shown in the following table, table 20.

TABLE 20

Results for mixture J stabilised with various amounts of RM-1

| Example | C10 | 10.1 | 10.2 | 10.3 | 10.4 |
|---|---|---|---|---|---|
| c(RM-1)/% | 0 | 0.10 | 0.15 | 0.20 | 0.25 |
| T(N, I)/° C. | 81.3 | t.b.d. | t.b.d. | t.b.d. | 84.7 |
| LT(−20° C.)/h | t.b.d. | >400 | t.b.d. | t.b.d. | t.b.d. |
| LT(−30° C.)/h | t.b.d. | >400 | t.b.d. | t.b.d. | t.b.d. |

| Example | 10.5 | 10.6 | 10.7 | 10.8 | 10.9 |
|---|---|---|---|---|---|
| c(RM-1)/% | 0.30 | 0.50 | 1.0 | 2.0 | 3.0 |
| T(N, I)/° C. | t.b.d. | t.b.d. | t.b.d. | t.b.d. | t.b.d. |
| LT(−20° C.)/h | >650 | >1,000 | t.b.d. | t.b.d. | t.b.d. |
| LT(−30° C.)/h | >400 | >500 | t.b.d. | t.b.d. | t.b.d. |

Remarks: t.b.d.: to be determined
LT: Stability at low temperature

Example 11

A further liquid-crystal mixture (liquid-crystal mixture K) having the composition and properties as indicated in the following table is prepared.

TABLE 21

Composition and properties of mixture K

Composition Compound

| No. | Abbreviation | c/% |
|---|---|---|
| 1 | APUQU-3-F | 3.5 |
| 2 | PUQU-3-F | 13.5 |
| 3 | PGUQU-3-F | 4.25 |
| 4 | PGUQU-4-F | 1.5 |
| 5 | CCEG-5-F | 10.0 |
| 6 | PPGU-3-F | 2.0 |
| 7 | CC-3-V | 33.5 |
| 8 | CC-3-V1 | 7.0 |
| 9 | PP-1-2V1 | 3.25 |
| 10 | CCP-V-1 | 9.5 |
| 11 | CCP-V2-1 | 12.0 |
| Σ | | 100.0 |

Physical properties

| | |
|---|---|
| T(N, I) = | 83.3° C. |
| $n_e$(20° C., 589.3 nm) = | 1.5845 |
| Δn (20° C., 589.3 nm) = | 0.0995 |
| $\epsilon\|\|$ (20° C., 1 kHz) = | 9.5 |
| Δε (20° C., 1 kHz) = | 6.5 |
| $\gamma_1$ (20° C.) = | 69 mPa·s |
| $k_1$ (20° C.) = | 13.8 pN |
| $k_3/k_1$(20° C.) = | 1.20 |
| $V_0$ (20° C.) = | t.b.d. V |

Remarks: t.b.d.: to be determined

This mixture is very highly suitable for displays in IPS mode. As in Example 2, the mixture is divided into four parts. The respective parts are treated and investigated as described in example 2, except that the lowest concentration of RM-1 has been changed to 0.30% from 0.25% here. The results are shown in the following table, table 20.

TABLE 22

Results for mixture K stabilised with various amounts of RM-1

| Example | C11 | 11.1 | 11.2 | 11.3 |
|---|---|---|---|---|
| c(RM-1)/% | 0 | 0.30 | 0.50 | 1.0 |
| T(N, I)/° C. | 83.3 | t.b.d. | t.b.d. | t.b.d. |

Remarks: t.b.d.: to be determined

Example 12

A further liquid-crystal mixture (liquid-crystal mixture L) having the composition and properties as indicated in the following table is prepared.

TABLE 23

Composition and properties of mixture L

Composition Compound

| No. | Abbreviation | c/% |
|---|---|---|
| 1 | PUQU-3-F | 16.0 |
| 2 | PGUQU-3-F | 7.0 |
| 3 | CPU-3-F | 8.0 |
| 4 | CC-3-O1 | 12.0 |
| 5 | PP-1-2V1 | 7.0 |
| 6 | CVCP-V-1 | 6.0 |
| 7 | CVCP-1V-O1 | 5.0 |
| 8 | PGP-2-3 | 8.0 |
| 9 | PGP-2-4 | 8.0 |
| 10 | PGP-2-5 | 8.0 |
| 11 | CPGP-5-2 | 8.0 |
| 12 | CPGP-5-3 | 8.0 |
| Σ | | 100.0 |

Physical properties

| | |
|---|---|
| T(N, I) = | 114.7° C. |
| $n_e$(20° C., 589.3 nm) = | 1.6930 |
| Δn (20° C., 589.3 nm) = | 0.1869 |
| $\epsilon_\parallel$ (20° C., 1 kHz) = | t.b.d. |
| Δε (20° C., 1 kHz) = | t.b.d. |
| $\gamma_1$ (20° C.) = | t.b.d. mPa·s |
| $k_1$ (20° C.) = | t.b.d. pN |
| $k_3/k_1$(20° C.) = | t.b.d. |
| $V_0$ (20° C.) = | t.b.d. V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 24.

TABLE 24

Results for mixture L stabilised with various amounts of RM-1

| Example | C12 | 12.1 | 12.2 | 12.3 |
|---|---|---|---|---|
| c(RM-1)/% | 0 | 0.25 | 0.50 | 1.0 |
| T(N, I)/° C. | 114.7 | t.b.d. | t.b.d. | t.b.d. |

Remarks: t.b.d.: to be determined

Example 13

A further liquid-crystal mixture (liquid-crystal mixture M) having the composition and properties as indicated in the following table is prepared.

TABLE 25

Composition and properties of mixture M

Composition Compound

| No. | Abbreviation | c/% |
|---|---|---|
| 1 | APUQU-3-F | 4.0 |
| 2 | PUQU-3-F | 13.0 |
| 3 | PGUQU-3-F | 4.0 |
| 4 | PPUQU-4-F | 4.0 |
| 5 | CCEG-5-F | 10.0 |
| 6 | CC-3-V | 31 |
| 7 | CC-3-V1 | 7.5 |
| 8 | PP-1-2V1 | 4.0 |
| 9 | CCP-V-1 | 10.5 |
| 10 | CCP-V2-1 | 12.0 |
| Σ | | 100.0 |

Physical properties

| | |
|---|---|
| T(N, I) = | 83.1° C. |
| $n_e$(20° C., 589.3 nm) = | 1.5854 |
| Δn (20° C., 589.3 nm) = | 0.0998 |
| $\epsilon_\parallel$ (20° C., 1 kHz) = | 10.0 |
| Δε (20° C., 1 kHz) = | 6.9 |
| $\gamma_1$ (20° C.) = | 74 mPa·s |
| $k_1$ (20° C.) = | 13.8 pN |
| $k_3/k_1$(20° C.) = | 1.19 |
| $V_0$ (20° C.) = | t.b.d. V |

Remarks: t.b.d.: to be determined

This mixture is very highly suitable for displays in IPS mode. As in Example 2, the mixture is divided into four parts. The respective parts are treated and investigated as described in example 11. The results are shown in the following table, table 26.

TABLE 26

Results for mixture M stabilised with various amounts of RM-1

| Example | C13 | 13.1 | 13.2 | 13.3 |
|---|---|---|---|---|
| c(RM-1)/% | 0 | 0.25 | 0.50 | 1.0 |
| T(N, I)/° C. | 83.1 | t.b.d. | t.b.d. | t.b.d. |

Remarks: t.b.d.: to be determined

Example 14

A further liquid-crystal mixture (liquid-crystal mixture N) having the composition and properties as indicated in the following table is prepared.

TABLE 27

Composition and properties of mixture N

Composition Compound

| No. | Abbreviation | c/% |
|---|---|---|
| 1 | PUQU-3-F | 13.73 |
| 2 | PPGP-3-F | 0.50 |

TABLE 27-continued

Composition and properties of mixture N

| | | |
|---|---|---|
| 3 | CC-3-V | 41.68 |
| 4 | CP-3-O1 | 4.43 |
| 5 | PP-1-2V1 | 8.33 |
| 6 | CCP-V-1 | 15.68 |
| 7 | CCP-V2-1 | 4.90 |
| 8 | CPP-3-2 | 11.75 |
| Σ | | 100.00 |

Physical properties

| | |
|---|---|
| $T(N, I) =$ | 70.2° C. |
| $n_e(20° C., 589.3 nm) =$ | 1.5904 |
| $\Delta n (20° C., 589.3 nm) =$ | 0.0994 |
| $\epsilon_{\parallel} (20° C., 1 kHz) =$ | 5.7 |
| $\Delta\epsilon (20° C., 1 kHz) =$ | 3.0 |
| $\gamma_1 (20° C.) =$ | 55 mPa·s |
| $k_1 (20° C.) =$ | 12.4 pN |
| $k_3/k_1(20° C.) =$ | 1.12 |
| $V_0 (20° C.) =$ | t.b.d. V |

Remarks: t.b.d.: to be determined

This mixture is very highly suitable for displays in IPS mode. As in Example 2, the mixture is divided into four parts. The respective parts are treated and investigated as described in example 2. The results are shown in the following table, table 28.

TABLE 28

Results for mixture N stabilised with various amounts of RM-1

| Example | C14 | 14.1 | 14.2 | 14.3 |
|---|---|---|---|---|
| c(RM-1)/% | 0 | 0.25 | 0.50 | 1.0 |
| T(N, I)/° C. | 70.2 | t.b.d. | t.b.d. | t.b.d. |

Remarks: t.b.d.: to be determined

Example 15

A further liquid-crystal mixture (liquid-crystal mixture O) having the composition and properties as indicated in the following table is prepared.

TABLE 29

Composition and properties of mixture O

Composition Compound

| No. | Abbreviation | c/% |
|---|---|---|
| 1 | CCQU-3-F | 9.0 |
| 2 | CCQU-5-F | 4.0 |
| 3 | PUQU-3-F | 8.5 |
| 4 | PGU-2-F | 7.0 |
| 5 | PGU-3-F | 8.0 |
| 6 | CCG-V-F | 8.0 |
| 7 | CC-3-V1 | 13.0 |
| 8 | CC-5-V | 15.0 |
| 9 | CP-3-O2 | 8.5 |
| 10 | CCP-V-1 | 10.0 |
| 11 | CCP-V2-1 | 7.0 |
| 12 | CCOC-3-3 | 2.0 |
| Σ | | 100.0 |

Physical properties

| | |
|---|---|
| $T(N, I) =$ | 80.0° C. |
| $n_e(20° C., 589.3 nm) =$ | 1.5885 |

TABLE 29-continued

Composition and properties of mixture O

| | |
|---|---|
| $\Delta n (20° C., 589.3 nm) =$ | 0.1026 |
| $\epsilon_{\parallel} (20° C., 1 kHz) =$ | 10.2 |
| $\Delta\epsilon (20° C., 1 kHz) =$ | 3.3 |
| $\gamma_1 (20° C.) =$ | 84 mPa·s |
| $k_1 (20° C.) =$ | 13.1 pN |
| $k_3/k_1(20° C.) =$ | 1.04 |
| $V_0 (20° C.) =$ | 1.47 V |

This mixture is very highly suitable for displays in IPS mode. The mixture is divided into four parts. The respective parts are treated and investigated as described in example 2. The results are shown in the following table, table 30.

TABLE 30

Results for mixture O stabilised with various amounts of RM-1

| Example | C15 | 15.1 | 15.2 | 15.3 |
|---|---|---|---|---|
| c(RM-1)/% | 0 | 0.25 | 0.50 | 1.0 |
| T(N, I)/° C. | 80.0 | t.b.d. | t.b.d. | t.b.d. |

Remarks: t.b.d.: to be determined

Example 16

A further liquid-crystal mixture (liquid-crystal mixture P) having the composition and properties as indicated in the following table is prepared.

TABLE 31

Composition and properties of mixture P

Composition Compound

| No. | Abbreviation | c/% |
|---|---|---|
| 1 | APUQU-3-F | 6.0 |
| 2 | PUQU-3-F | 10.0 |
| 3 | PGUQU-3-F | 4.0 |
| 4 | CCP-3-OT | 6.0 |
| 5 | CPU-3-F | 6.0 |
| 6 | CPGU-3-OT | 4.0 |
| 7 | CC-3-V | 42.0 |
| | CC-3-V1 | 3.0 |
| | CCP-V-1 | 14.0 |
| 8 | PGP-2-2V | 5.0 |
| Σ | | 100.0 |

Physical properties

| | |
|---|---|
| $T(N, I) =$ | 80.0° C. |
| $n_e(20° C., 589.3 nm) =$ | 1.5857 |
| $\Delta n (20° C., 589.3 nm) =$ | 0.1024 |
| $\epsilon_{\parallel} (20° C., 1 kHz) =$ | 9.8 |
| $\Delta\epsilon (20° C., 1 kHz) =$ | 3.1 |
| $\gamma_1 (20° C.) =$ | 62 mPa·s |
| $k_1 (20° C.) =$ | 12.4 pN |
| $k_3/k_1(20° C.) =$ | 1.17 |
| $V_0 (20° C.) =$ | 1.42 V |

This mixture is very highly suitable for displays in IPS mode. As in Example 2, the mixture is divided into four parts. The respective parts are treated and investigated as described in example 2. The results are shown in the following table, table 32.

TABLE 32

Results for mixture P stabilised with various amounts of RM-1

| Example | C16 | 16.1 | 16.2 | 16.3 |
|---|---|---|---|---|
| c(RM-1)/% | 0 | 0.25 | 0.50 | 1.0 |
| T(N, I)/° C. | 80.0 | t.b.d. | t.b.d. | t.b.d. |

Remarks: t.b.d.: to be determined

Example 17

A further liquid-crystal mixture (liquid-crystal mixture Q) having the composition and properties as indicated in the following table is prepared.

TABLE 33

Composition and properties of mixture P

| Composition | | |
|---|---|---|
| Compound | | |
| No. | Abbreviation | c/% |
| 1 | PUQU-3-F | 14.0 |
| 2 | CCP-V-F | 10.0 |
| 3 | PGU-2-F | 5.5 |
| 4 | PGU-2-F | 10.0 |
| 5 | CC-3-V1 | 16.0 |
| 6 | CC-5-V | 19.5 |
| 7 | CP-3-O2 | 2.0 |
| | CCP-V-1 | 11.0 |
| | CCP-V2-1 | 7.0 |
| 8 | CCOC-3-3 | 5.0 |
| Σ | | 100.0 |

Physical properties

| | |
|---|---|
| T(N, I) = | 80.0° C. |
| $n_e$ (20° C., 589.3 nm) = | 1.5928 |
| Δn (20° C., 589.3 nm) = | 0.1045 |
| ε∥ (20° C., 1 kHz) = | 10.2 |
| Δε (20° C., 1 kHz) = | 3.3 |
| $\gamma_1$ (20° C.) = | 72 mPa · s |
| $k_1$ (20° C.) = | 13.2 pN |
| $k_3/k_1$ (20° C.) = | 1.06 |
| $V_0$ (20° C.) = | 1.46 V |

This mixture is very highly suitable for displays in IPS mode. As in Example 2, the mixture is divided into four parts. The respective parts are treated and investigated as described in example 2. The results are shown in the following table, table 34.

TABLE 34

Results for mixture Q stabilised with various amounts of RM-1

| Example | C17 | 17.1 | 17.2 | 17.3 |
|---|---|---|---|---|
| c(RM-1)/% | 0 | 0.25 | 0.50 | 1.0 |
| T(N, I)/° C. | 80.0 | t.b.d. | t.b.d. | t.b.d. |

Remarks: t.b.d.: to be determined

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding EP application No. 11002916.2, filed Apr. 7, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium having positive dielectric anisotropy, comprising
one or more polymerizable compounds of formula I

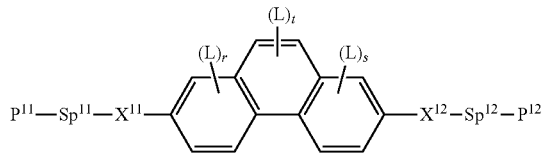

in which
$P^{11}$ and $P^{12}$ are independently from one another a polymerizable group,
$Sp^{11}$ and $Sp^{12}$ are independently from one another a spacer group having from one to 10 C-atoms or a single bond,
$X^{11}$ and $X^{12}$ are independently from one another —O—, —O—CO—, —CO—O—, —O—CO—O— or a single bond,
L are in each occurrence independently from each other H, F, Cl or alkyl with 1 to 5 C-atoms,
r and s independently of one another are 0, 1, 2 or 3, and
t is 0, 1 or 2,
and
one or more dielectrically positive compounds of formula II-2j

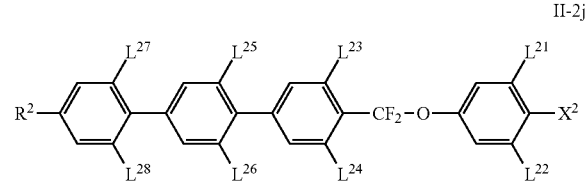

in which
$R^2$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,
$X^2$ denotes halogen, halogenated alkyl or alkoxy having 1 to 3 C atoms or halogenated alkenyl or alkenyloxy having 2 or 3 C atoms, and
$L^{21}$ to $L^{28}$ independently of one another, denote H or F, and
one or more dielectrically positive compounds of formula III-1f-4

III-1f-4

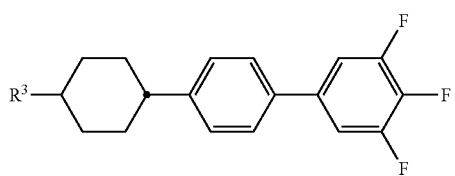

in which

R³ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms.

2. A medium according to claim 1, wherein the concentration of the polymerizable compounds of formula I in the medium is 0.05% to 10%.

3. A medium according to claim 1, which, besides the compounds of formula I, additionally comprises further polymerizable compounds.

4. A medium according to claim 1, further comprising one or more compounds of formula II, which are not a compound of formula II-2j,

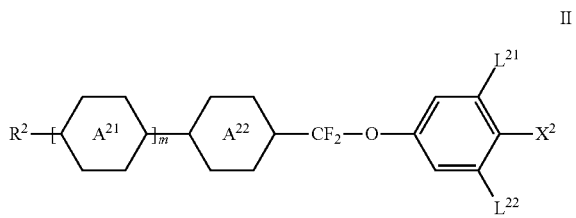

in which

R² denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

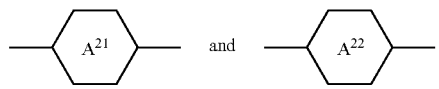

on each appearance, independently of one another, denote

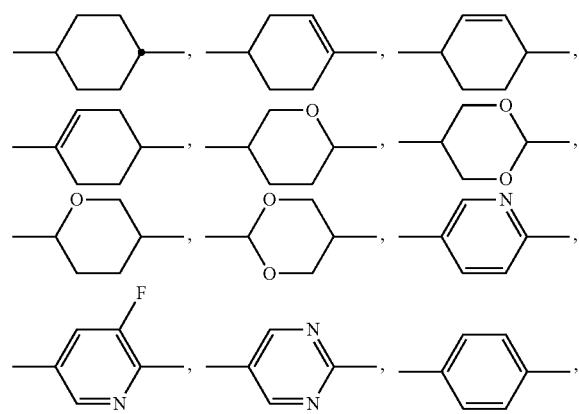

-continued

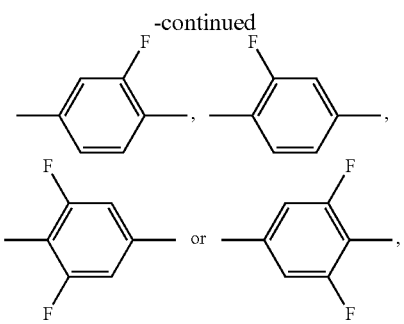

L²¹ and L²² independently of one another, denote H or F,
X² denotes halogen, halogenated alkyl or alkoxy having 1 to 3 C atoms or halogenated alkenyl or alkenyloxy having 2 or 3 C atoms,
m denotes 0, 1, 2 or 3.

5. A medium according to claim 1, further comprising one or more compounds of formula III, which are not a compound of formula III-1f-4,

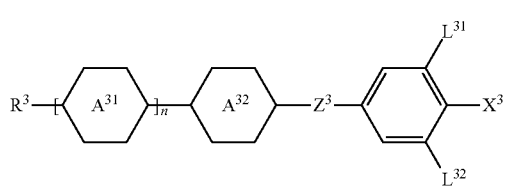

in which

R³ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

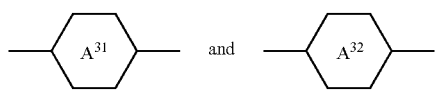

on each appearance, independently of one another, denote

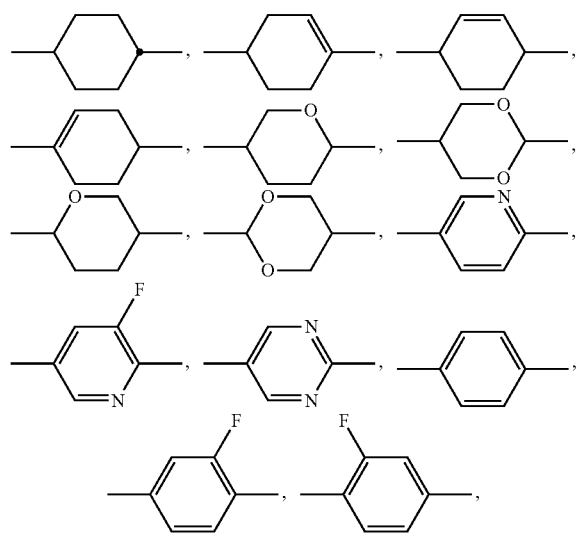

-continued

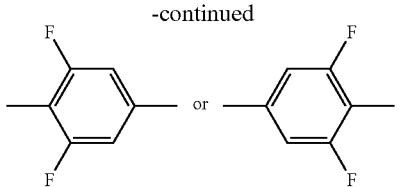

in which
L$^{31}$ and L$^{32}$ independently of one another, denote H or F,
X$^{3}$ denotes halogen, halogenated alkyl or alkoxy having 1 to 3 C atoms or halogenated alkenyl or alkenyloxy having 2 or 3 C atoms,
Z$^{3}$ denotes —CH$_2$CH$_2$—, —CF$_2$CF$_2$—, —COO—, trans-CH=CH—, trans-CF=CF—, —CH$_2$O— or a single bond, and
n denotes 0, 1, 2 or 3.

6. A liquid-crystalline medium having positive dielectric anisotropy, comprising
one or more polymerizable compounds of formula I

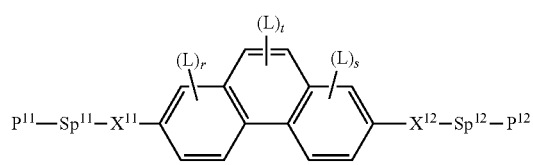

in which
P$^{11}$ and P$^{12}$ are independently from one another a polymerizable group,
Sp$^{11}$ and Sp$^{12}$ are independently from one another a spacer group having from one to 10 C-atoms or a single bond,
X$^{11}$ and X$^{12}$ are independently from one another —O—, —O—CO—, —CO—O—, —O—CO—O— or a single bond,
L are in each occurrence independently from each other H, F, Cl or alkyl with 1 to 5 C-atoms,
r and s independently of one another are 0, 1, 2 or 3, and
t is 0, 1 or 2,
and
one or more dielectrically positive compounds of formula II-2j

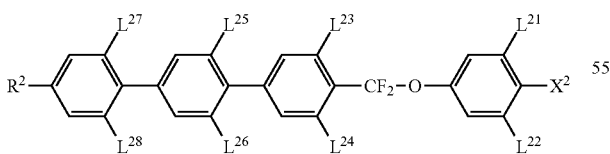

in which
R$^{2}$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,
X$^{2}$ denotes halogen, halogenated alkyl or alkoxy having 1 to 3 C atoms or halogenated alkenyl or alkenyloxy having 2 or 3 C atoms, and L$^{21}$ to L$^{28}$ independently of one another, denote H or F,
and
one or more dielectrically positive compounds of formula III-1f-4

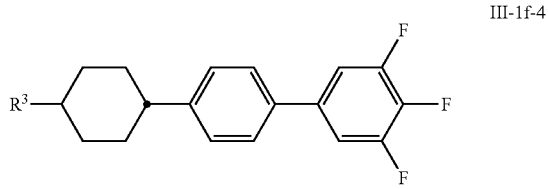

in which
R$^{3}$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms
and
one or more dielectrically neutral compounds of formula IV

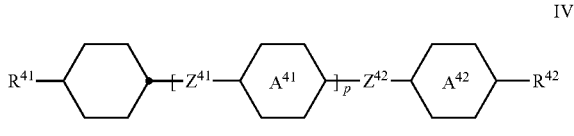

in which
R$^{41}$ and R$^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

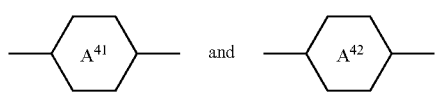

independently of one another and, if

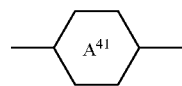

occurs twice, these also independently of one another, denote

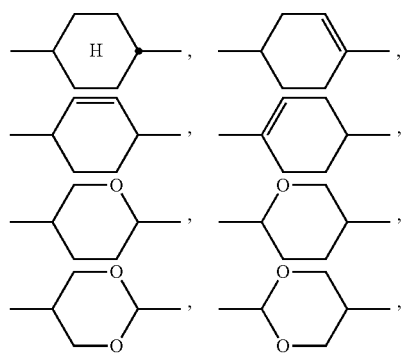

-continued

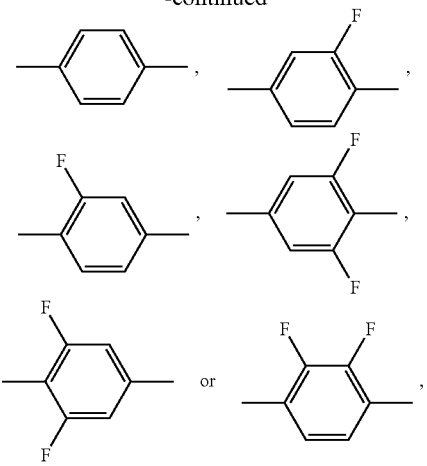

$Z^{41}$ and $Z^{42}$ independently of one another and, if $Z^{41}$ occurs twice, these also independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

7. A liquid-crystalline medium having positive dielectric anisotropy, comprising
one or more polymerizable compounds of formula I

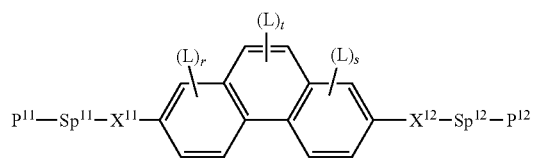

in which
P$^{11}$ and P$^{12}$ are independently from one another a polymerizable group,
Sp$^{11}$ and Sp$^{12}$ are independently from one another a spacer group having from one to 10 C-atoms or a single bond,
X$^{11}$ and X$^{12}$ are independently from one another —O—, —O—CO—, —CO—O—, —O—CO—O— or a single bond,
L are in each occurrence independently from each other H, F, Cl or alkyl with 1 to 5 C-atoms,
r and s independently of one another are 0, 1, 2 or 3, and
t is 0, 1 or 2,
and
one or more dielectrically positive compounds of formula II-2j

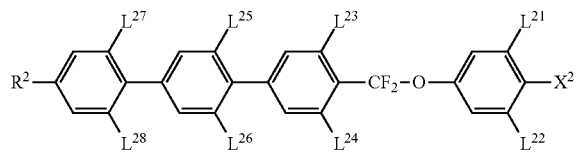

in which
R$^2$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,
X$^2$ denotes halogen, halogenated alkyl or alkoxy having 1 to 3 C atoms or halogenated alkenyl or alkenyloxy having 2 or 3 C atoms, and
L$^{21}$ to L$^{28}$ independently of one another, denote H or F,
and
one or more dielectrically positive compounds of formula III-1f-4

III-1f-4

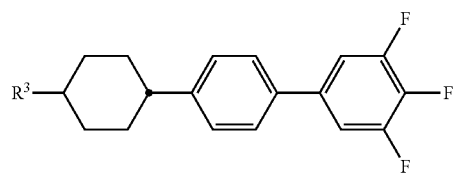

in which
R$^3$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms
and
one or more dielectrically neutral compounds of formula V

V

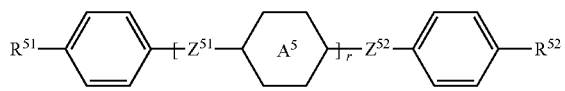

in which
R$^{51}$ and R$^{52}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

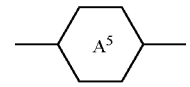

and, if it occurs twice, independently of one another on each occurrence, denotes

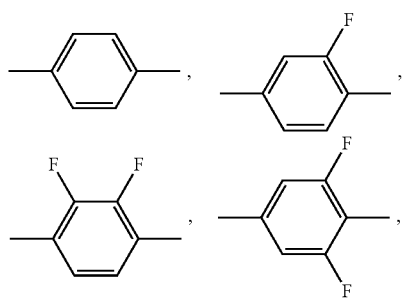

-continued

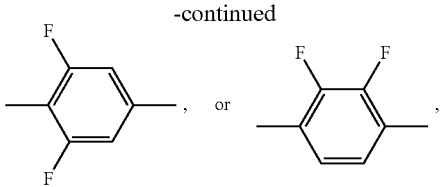

Z$^{51}$ and Z$^{52}$ independently of one another and, if Z$^{51}$ occurs twice, these also independently of one another, denote —CH$_2$CH$_2$—, —COO—, trans-CH=CH—, trans-CF=CF—, —CH$_2$O—, —CF$_2$O— or a single bond, and r denotes 0, 1 or 2.

8. A liquid crystal display, which contains a medium according to claim 1.

9. A display, which contains a medium according to claim 1 which has been stabilized by polymerization of the one or more polymerizable compounds in said medium.

10. A display according to claim 8, which is addressable by an active matrix.

11. A display according to claim 8, which is a PS-IPS or PS-FFS display.

12. A display according to claim 8, which is a PS positive VA display.

13. A process for preparing a liquid-crystal display, comprising stabilizing a medium according to claim 1 in the display by polymerization of the one or more polymerizable compounds in said medium.

14. A process according to claim 13, wherein no electrical voltage is applied during the polymerization of the one or more polymerizable compounds in said medium.

15. A medium according to claim 1, wherein in formula I, L are in each occurrence independently from each other H, F or Cl.

16. A medium according to claim 1, which further comprises a compound of formula V-1

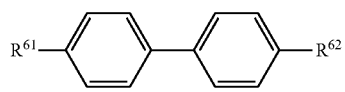

V-1 in which

R$^{61}$ and R$^{62}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms.

17. A medium according to claim 1, which further comprises a compound of formula V-2

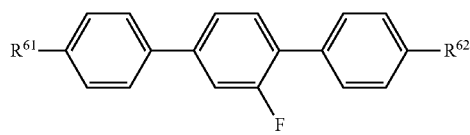

V-2 in which

R$^{61}$ and R$^{62}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms.

18. A medium according to claim 1, which further comprises a compound of formula IV-14

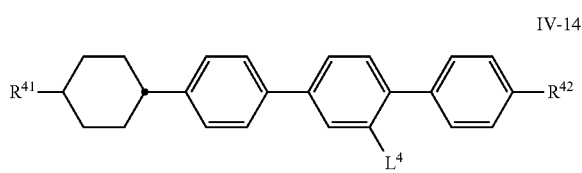

IV-14 in which

R$^{41}$ and R$^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms, and L$^4$ denotes H or F.

19. A medium according to claim 1, which further comprises a compound of formula CC-n-Vm and/or CC-n-V

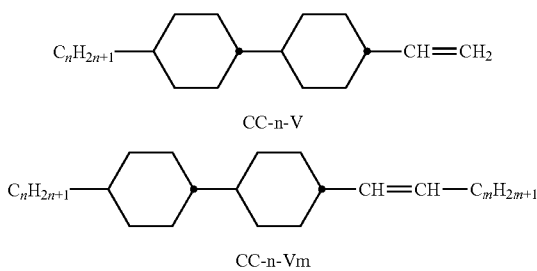

CC-n-V

CC-n-Vm wherein m is 1 and n is 1 to 7.

20. A medium according to claim 1, which further comprises a compound of formula IV-1

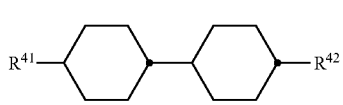

IV-1 in which

R$^{41}$ and R$^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms.

* * * * *